(12) United States Patent
Braud et al.

(10) Patent No.: US 8,327,257 B2
(45) Date of Patent: Dec. 4, 2012

(54) FACILITATING DATA MANIPULATION IN A BROWSER-BASED USER INTERFACE OF AN ENTERPRISE BUSINESS APPLICATION

(75) Inventors: Luke A. Braud, Sunnyvale, CA (US); Baruch Goldwasser, San Francisco, CA (US); Evan M. Goldberg, Woodside, CA (US)

(73) Assignee: NetSuite Inc., San Mateo, CA (US)

( * ) Notice: Subject to any disclaimer, the term of this patent is extended or adjusted under 35 U.S.C. 154(b) by 487 days.

(21) Appl. No.: 12/698,879

(22) Filed: Feb. 2, 2010

(65) Prior Publication Data
US 2010/0138734 A1 Jun. 3, 2010

Related U.S. Application Data

(60) Division of application No. 10/665,308, filed on Sep. 18, 2003, now Pat. No. 7,685,515, which is a continuation-in-part of application No. 10/406,915, filed on Apr. 4, 2003, now Pat. No. 7,685,010.

(51) Int. Cl.
*G06F 17/00* (2006.01)
(52) U.S. Cl. .................................................. 715/219
(58) Field of Classification Search .............. 715/212, 715/219, 220, 227, 255
See application file for complete search history.

(56) References Cited

U.S. PATENT DOCUMENTS

| | | | |
|---|---|---|---|
| 5,832,496 A | 11/1998 | Anand et al. | |
| 5,842,193 A | 11/1998 | Reilly | |
| 5,926,806 A | 7/1999 | Marshall et al. | |
| 6,025,841 A | 2/2000 | Finkelstein et al. | |
| 6,359,976 B1 | 3/2002 | Kalyanpur et al. | |
| 6,438,545 B1 | 8/2002 | Beauregard et al. | |
| 6,611,839 B1 | 8/2003 | Nwabueze | |
| 6,640,249 B1 | 10/2003 | Bowlman-Amuah | |
| 6,641,037 B2 | 11/2003 | Williams | |
| 6,785,718 B2 | 8/2004 | Hancock et al. | |
| 6,839,702 B1 | 1/2005 | Patel et al. | |
| 6,856,942 B2 | 2/2005 | Garnett et al. | |

(Continued)

OTHER PUBLICATIONS

Wilson, Ralph E., "A Simply Way to Format HTML E-Mail Newsletters," *Web Marketing Today*, [online] Jan. 1, 2000, Issue 67, Retrieved from the Internet: <URL: http://www.wilsonweb.com/wmt5/html-email-format.htm>.

(Continued)

*Primary Examiner* — Laurie Ries
(74) *Attorney, Agent, or Firm* — Lane Powell PC

(57) ABSTRACT

Optimal presentation and editing of business data in a browser-based user interface of an integrated web-based business information system is described, including a browser at a user computer in dynamic communication with a web server allowing database editing and updating without browser page refreshes. For optimizing the data input/editing experience of the user, an array of features in various combinations is provided including: single-click instantiation of cell editing in a table displayed by the browser; single off-click or keyboard commits instantiating cell-wise data transfers; bulk editing allowing group modification of data elements across a plurality of adjacently-displayed or non-adjacently displayed records; client-side, location-based caching of old cell values allowing selective go-back for any edited or bulk-edited cell, in any order desired by the user, prior to a page-refreshing input event; and easy establishment/modification of sub-records associated with any of a displayed list of records using sub-record access icons, rollover menus, and auxiliary browser windows.

8 Claims, 22 Drawing Sheets

U.S. PATENT DOCUMENTS

| | | | |
|---|---|---|---|
| 6,871,214 | B2 | 3/2005 | Parsons et al. |
| 6,999,959 | B1 | 2/2006 | Lawrence et al. |
| 7,007,018 | B1 | 2/2006 | Kirkwood et al. |
| 7,107,285 | B2 * | 9/2006 | von Kaenel et al. ............ 1/1 |
| 7,130,885 | B2 * | 10/2006 | Chandra et al. ............ 709/206 |
| 7,231,596 | B2 * | 6/2007 | Koren ............ 715/210 |
| 7,240,280 | B2 | 7/2007 | Jolley et al. |
| 7,461,077 | B1 | 12/2008 | Greenwood |
| 7,472,342 | B2 | 12/2008 | Haut et al. |
| 7,496,687 | B2 | 2/2009 | Griffin et al. |
| 2001/0034771 | A1 | 10/2001 | Hutsch et al. |
| 2002/0069204 | A1 | 6/2002 | Kahn et al. |
| 2002/0123957 | A1 | 9/2002 | Notarius et al. |
| 2002/0152399 | A1 | 10/2002 | Smith et al. |
| 2002/0169797 | A1 | 11/2002 | Hegde et al. |
| 2002/0188486 | A1 | 12/2002 | Gil et al. |
| 2002/0188513 | A1 | 12/2002 | Gil et al. |
| 2002/0198800 | A1 | 12/2002 | Shamrakov |
| 2003/0001885 | A1 | 1/2003 | Lin et al. |
| 2003/0033179 | A1 | 2/2003 | Katz et al. |
| 2003/0061482 | A1 | 3/2003 | Emmerichs |
| 2003/0158975 | A1 | 8/2003 | Frank et al. |
| 2003/0167315 | A1 | 9/2003 | Chowdhry et al. |
| 2004/0193851 | A1 | 9/2004 | Chu |

OTHER PUBLICATIONS

Babcock, Charles, "Isomoric Broadens Rich Web Client Appeal," *The Foggy Mountain Report*, No. 19, San Francisco, CA, published at www.charlesbabcock.com, (Jan. 13, 2003).

CIO.Com, "Executive Summaries: Enterprise Resource Planning," CXO Media, inc. (Aug. 22, 2002), as printed on Mar. 27, 2003 from www.cio.com/summaries/enterprise/erp/index.html.

Dragan, Richard V., "CRM Goes Mainstream," PC Magazine, New York, vol. 20, Iss. 11, p. 28 (Jun. 12, 2001).

Goodman, D., *JavaScript Bible:* Gold Edition, Hungry Minds, Inc. (2001). (cover page and table of contents only).

Isomorphic Software, "Isomorphic SmartClient (ISC) Historical/Competitive Brief," Isomorphic Software, Inc., San Francisco, CA (Jun. 12, 2003).

Isomorphic Software, "Isomorphic SmartClient (ISC) Technology Brief," Isomorphic Software, Inc., San Francisco, CA (Jun. 10, 2003).

"Netledger 1 Day Test Drive Login" NetLedger, retrieved from internet from: <testdrive.netledger.com> archived Apr. 22, 2001.

"NetLedger Launches NetSuite, the First Online Suite That Combines ERP and CRM Functionality Aimed at Companies With Fewer Than 500 Employees," Internet retailer. Retrieved from Internet <http://www.internetretailer.com/internet/marketing-conference/566678728-netledger-launches-netsuitetm.html> (Oct. 15, 2002).

Novotny, Jason, et al. "Gridlab Portal Design," downloaded from http://www.gridlab.org/WorkPackages/wp-4/Documents/GridSphere.pdf, pp. Cover, 1-43. (2001).

Patricia Seybold Group, "An Executive's Guide to CRM: How to Evaluate CRM Alternatives by Functionality, Architecture & Analytics" (2002), as printed on Mar. 27, 2003 from www.psgroup.com/freereport/imedia/CRM-EXCELGUIDE3-02.pdf.

Ray, D. and Ray, E., *Mastering HTML and XHTML*, SYBEX, Inc., (2002) (cover page and table of contents only).

* cited by examiner

FIG. 2

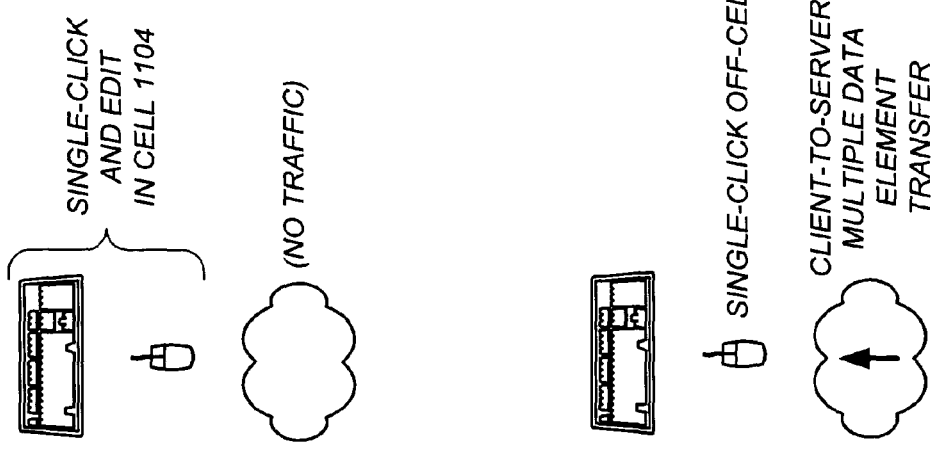
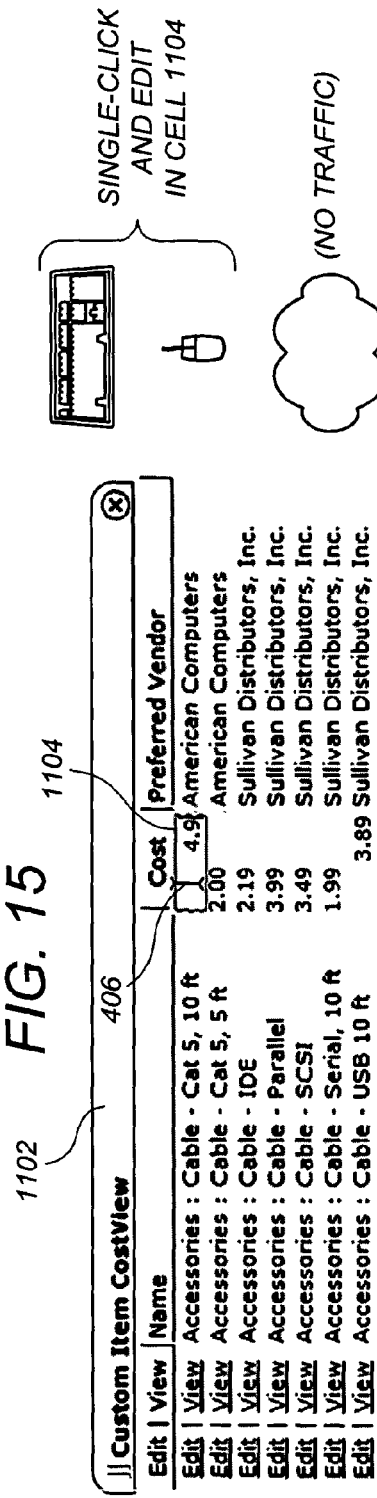
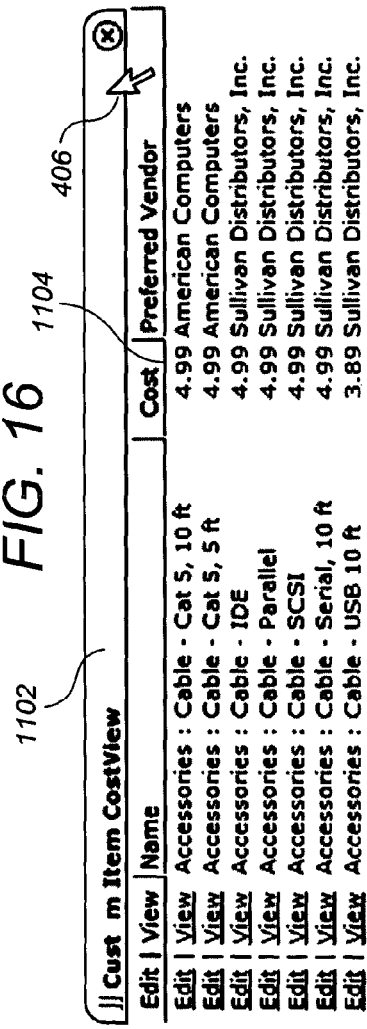
FIG. 15
FIG. 16

Customers & Jobs

Lists > Customers & Jobs >

| New | Edit | View | Name ▲ | Category | Company Name | Sales Rep | Phone |
|---|---|---|---|---|---|---|---|
| ▶ | Edit | View | A Wolfe | Individual | Wolfe Electronics | Clark Koozer | 342-888-6567 |
| ▶ | Edit | View | Andrew A. Anderson | Individual | AAA Driving School | A Wolfe | 540-888-9876 |
| ▶ | Edit | View | Andy Grove | Corporate | Intel Inc. | A Wolfe | 206-555-1302 |
| ▶ | Edit | View | Arnold Schwagger | Corporate | Terminator Industries | Sam R Cruz | 800-555-0609 |
| ▶ | Edit | View | Benny H. Waters | Corporate | Benihaha | A Wolfe | 435-867-9999 |
| ▶ | Edit | View | Bill Gates | Corporate | Microsoft Inc | A Wolfe | 989-111-1234 |
| ▶ | Edit | View | Brenda Brendawitz | Individual | Brendawitz Nursing | A Wolfe | 877-987-7654 |
| ▶ | Edit | View | Brian Chess | Individual | Chess Art Gallery | A Wolfe | 831-555-5229 |
| ▶ | Edit | View | Brian Sharpe | Individual | B-Sharp Music | Krista Barton | 800-555-4681 |
| ▶ | Edit | View | Cervantes V. Medeiros | Corporate | Cerveza La Beppo | Mark Grogan | 650-555-7709 |
| ▶ | Edit | View | Chuck E. Mozza | Corporate | Cheese Factory | Krista Barton | 650/555-1212 |
| ▶ | Edit | View | Eric B Schmidt | Individual | Schmidt Consulting | Neil Thomson | 312-555-0704 |
| ▶ | Edit | View | Fabrizio, Daniel B. | Corporate | Haystack Laboratories | Clark Koozer | 222-222-2221 |

Sales Rep [- All -] Stage [Customer] Total Found: 35 [New] [Print] [Customize View] [Export]

Show Inactives ☐ Report Style ☐ View [Company] Show Quick Add ☐

FIG. 21

| Home | Transactions | Lists | Reports | Setup | Support | Intranet |

Lists > Customers & Jobs >

Customers & Jobs

| New | Edit | View | Name | Category | Company Name | Sales Rep | Phone |
|---|---|---|---|---|---|---|---|
| ☐ | Edit | View | A Wolfe | Individual | Wolfe Electronics | Clark Koozer | 342-888-6567 |
| ☐ | Edit | View | Andrew A. Anderson | Individual | AAA Driving School | A Wolfe | 540-888-9876 |
| ☐ | Edit | View | Andy Grove | Corporate | Intel Inc. | A Wolfe | 206-555-1302 |
| ☐ | Edit | View | Arnold Schwagger | Corporate | Terminator Industries | Sam R Cruz | 800-555-0609 |
| ☐ | Edit | View | Benny H. Waters | Corporate | Benihaha | A Wolfe | 435-867-9999 |
| ☐ | Edit | View | Bill Gates | Corporate | Microsoft Inc | A Wolfe | 989-111-1234 |
| ☐ | Edit | View | Brenda Brendawitz | Individual | Brendawitz Nursing | A Wolfe | 877-987-7654 |
| ☐ | Edit | View | Brian Chess | Individual | Chess Art Gallery | Krista Barton | 831-555-5229 |
| ☐ | Edit | View | Brian Sharpe | Individual | B-Sharp Music | A Wolfe | 800-555-4681 |
| ☐ | Edit | View | Cervantes V. Medeiros | Corporate | Cervezo Lo Beppo | Mark Grogan | 650-555-7709 |

Customer | Company Name | Phone | E-Mail
Add [Alan Q. MacPherson] [Strutz Pharmaceuticals] [650-464-9876] [alan@str]

Sales Rep [- All -] Stage [Customer ▼] Total Found: 35 [New] [Print] [Customize View] [Export]

Show Inactives ☐ Report Style ☐ View [Company ▼] Show Quick Add ☑

FACILITATING DATA MANIPULATION IN A BROWSER-BASED USER INTERFACE OF AN ENTERPRISE BUSINESS APPLICATION

CROSS-REFERENCE TO RELATED APPLICATIONS

This is a divisional of U.S. patent application Ser. No. 10/665,308, filed Sep. 18, 2003 now U.S. Pat. No. 7,685,515, which is a continuation-in-part of U.S. patent application Ser. No. 10/406,915, filed Apr. 4, 2003 now U.S. Pat. No. 7,685,010, the complete disclosures of which are incorporated herein by reference.

FIELD

This patent specification relates to user interfaces of business management software and systems. More particularly, this patent specification relates to a method, system, computer program product, and related business methods for easy user manipulation of data in a browser-based user interface of a web-based enterprise business application.

BACKGROUND

As described in Ser. No. 10/406,915, supra, functional and strategic advantages for commercial enterprises can be achieved by using an integrated business system comprising ERP (Enterprise Resource Planning), CRM (Customer Relationship Management), and other business capabilities accessible using a thin-client, browser-based user interface. Also as described in Ser. No. 10/406,915, these advantages can be enhanced where the user interface is configured to concisely communicate real-time business information by displaying a plurality of portlet windows within a browser window, the plurality of portlet windows being selected and arranged according to a customizable user profile for each user. By way of example, the plurality of portlet windows can include: business reporting portlets for displaying up-to-date business results; calendar application portlets; task list application portlets; employee/customer contact list application portlets; search portlets; and generally any of a variety of combinations of business reporting and/or application portlets dedicated to different ERP, CRM, and other business capabilities. In one or more of the preferred embodiments described in Ser. No. 10/406,915, the browser-based user interface is similar to an "executive dashboard" feature of the NetSuite™ service offered by NetSuite, Inc. (formerly NetLedger, Inc.) of San Mateo, Calif.

In addition to optimizing accessibility and display of up-to-date business information in the browser-based user interface, it has been found that optimizing the experience of inputting and editing the business information can drastically increase the usefulness, desirability, and marketability of the web-based integrated business system. In an environment where so much business power is concisely presented to the eyes and fingertips of the business user, it has been found that even subtle differences in the nature of the keystrokes, mouse movements, and mouse clicks that input or edit the business information can create large differences in user appeal toward the web-based integrated business system. In a related aspect, it is desirable to achieve an optimal balance among (i) prompt data permanence, i.e., prompt transfer of new data from the browser to the server, (ii) effective client-side go-back features for easy correction of recent inputs, and (iii) efficient network traffic flow. In another related aspect, it is desirable to achieve an efficient balance between (i) easy user changeability of many database entries relating to a particular displayed record, and (ii) achieving a user display that is not overcrowded with information.

As used herein, the term web page refers to a generally self-contained (except for cached data) body of content and commands generated by a web server and transferred over a network to a web browser for rendering and execution, the body of content and commands being sent responsive to a page request received from the web browser. The page request can alternatively be termed a page commit or a page refresh. As used herein, the term web page display refers to a rendering of the web page by the browser for visual (or audiovisual) presentation to the user according to the content and commands contained in the web page. A web page may comprise one or more frames which, as used herein, comprise distinct bodies of content and commands generated by a web server and are transferred over a network to a web browser responsive to a page request and/or a frame request, renderings of which may be simultaneously displayed by a browser.

As used herein, the term record refers to a representation of two or more related data elements as would be kept, for example, as part of a relational database. The data elements can alternatively be termed cells. By way of example, an employee directory listing may comprise one record per employee, each record comprising multiple data elements or cells including first name, last name, telephone extension, mail stop, and e-mail address. As used herein the term table refers to a listing of one or more such records.

In U.S. 2003/0001885A1, published Jan. 2, 2003, entitled "Method of Generating a Dynamic Editable Table in a Web Page," a web page comprising JavaScript implementing "dynamic interactive operations" on a table is discussed, including "allowing the client to perform various editing and statistical operations on the dynamic editable table" and "simultaneously" storing the corresponding data on the server. An article entitled "Isomorphic Broadens Rich Web Client Appeal" by Charles Babcock, *The Foggy Mountain Report*, No. 19 (Jan. 8, 2003), discusses "inline editing of databound grids (double-click in a cell in the Instant Data Application example to edit)." However, it is believed that neither of these references proposes the optimized user input and editing experience described herein that takes into account special needs and tendencies of the business user as they are presented with a browser window containing a wide variety and range of concise ERP, CRM, and other business information.

Accordingly, it would be desirable to provide a browser-based user interface for a web-based integrated business information system that facilitates efficient user input and/or editing of business data.

It would be further desirable to provide such a browser-based user interface that also facilitates efficient user perception of real-time business information.

It would be still further desirable to provide such a browser-based user interface that allows business executives to perceive, at a glance, overviews of key business performance metrics corresponding to information stored in the integrated business information system.

It would be even further desirable to provide such a browser-based user interface that also achieves an optimal balance among prompt data permanence, effective client-side go-back features, and efficient network traffic flow.

It would be still further desirable to provide such a browser-based user interface that is not dependent on runtime downloads such as the Java Virtual Machine, while also being sufficiently feature-rich to enable optimized data input and/or editing features.

It would be still further desirable to provide such a browser-based user interface that also achieves an efficient balance between (i) easy user changeability of many database entries relating to a particular displayed record, and (ii) a user display that is not overcrowded with information.

SUMMARY

A method, system, computer program product, and related business methods are provided for optimally presenting and editing business data in a web-based integrated business system having thin-client, browser-based user access. A web page generated by a web server is received and displayed by a browser at a user computer, the browser displaying a list of records derived from the database, each record comprising a plurality of cells. In one preferred embodiment, responsive to a single-click selection of a cell and without requiring intervening user input, the selected cell is placed in an EDIT state and visually highlighting for editing. After receiving editing commands and a terminating input such as a click-off or a predetermined cell-committing keyboard input, the new cell value is displayed and dynamically communicated to the web server without requiring a page refresh of the browser.

In another preferred embodiment, when a cell is modified and the new value communicated to the web server, the old cell value is maintained in browser memory. At any time after cell modification but prior to a page-refreshing input event, the user may return to the cell and select a go-back command (e.g., CNTL-Z), which causes the old cell value to be displayed and communicated to the web server, without requiring a page refresh. In contrast to go-back schemes that perform sequential keystroke-caching, the preferred go-back scheme maintains old cell values in the browser memory according to their table location. This allows the user, prior to a page refresh, to restore old values to the modified cells in any order, and without requiring a query to the web server. The above preferred method has been found to provide an advantageous balance among data permanence, efficient network traffic flow, and go-back convenience.

In another preferred embodiment, a bulk editing feature is provided in the browser-based user interface that allows easy group modification of data cells in adjacently listed records. When a first cell in a data column is selected using a single-click input and a second cell in the same data column is selected using a bulk selection input (such as a SHIFT-click), any cells lying between the first and second cells are also selected and highlighted. Upon user editing of the first cell establishing a first value and a terminating input such as a click-off or a predetermined cell-committing keyboard input, all of the values in the first, second, and intervening cells are modified according to the first value, and these changes are dynamically communicated to the web server without requiring a page refresh of the browser. In another preferred embodiment, easy group modification of non-adjacently listed records is provided by using a bulk group addition input (such as a CNTL-click) for adding cells to the bulk editing cell group. In still another preferred embodiment, the advantages of pre-page-refresh client-side caching of old cell values are combined with these bulk editing features, allowing selective go-back for any of the bulk-edited cells, in any order desired by the user, prior to a page-refreshing input event, and without requiring a query to the web server.

In another preferred embodiment, easy establishment or modification of sub-records associated with any one of a displayed list of records is provided. A first browser window displays a row-wise list of records, and further displays a sub-record access icon adjacent to each record. When the user rolls over the sub-record access icon, a rollover menu is displayed comprising a plurality of sub-record identifiers associated with the record adjacent to that sub-record access icon. Upon receipt of a user selection of one of the sub-record identifiers, and without refreshing the first browser window, a second browser window is spawned for receiving user inputs establishing or modifying a sub-record associated with the selected sub-record identifier. Upon transfer of the established or modified sub-record information from the user computer to the web server, the second window is closed. In this manner, sub-records associated with a record listed in the first browser window are established or modified without refreshing the first browser window, thereby maintaining continuity of record list presentation while also allowing substantive database changes associated therewith.

Preferably, the above browser-based editing capabilities or extreme list editing capabilities are implemented in a web-based integrated business system that has at least ERP and CRM functionality, the browser-based user interface displaying a plurality of portlet windows within a browser window, each portlet window occupying a relatively small area within the browser window. The plurality of portlet windows are selected and arranged according to a customizable user profile for each user, and include any of a variety of combinations of business reporting and/or application portlets dedicated to different ERP, CRM, and other business capabilities. Integrating the features and advantages of the browser-based editing capabilities described herein with one or more of the browser-based executive dashboard capabilities described in Ser. No. 10/406,915, supra, has been found to achieve a powerful, appealing, and highly marketable service offering.

BRIEF DESCRIPTION OF THE DRAWINGS

FIG. 2 illustrates a home page/dashboard of an interactive browser-based user interface according to a preferred embodiment;

FIGS. 11-19 illustrate conceptual diagrams of a browser-based user interface, user input occurrences associated with the browser-based user interface, and network communication occurrences associated therewith corresponding to various steps outlined in FIG. 10;

FIGS. 21-23 illustrate conceptual diagrams of a browser-based user interface corresponding to various steps outlined in FIG. 20;

FIGS. 25-26 illustrate conceptual diagrams of a browser-based user interface corresponding to various steps outlined in FIG. 24.

DETAILED DESCRIPTION

Figure 1:
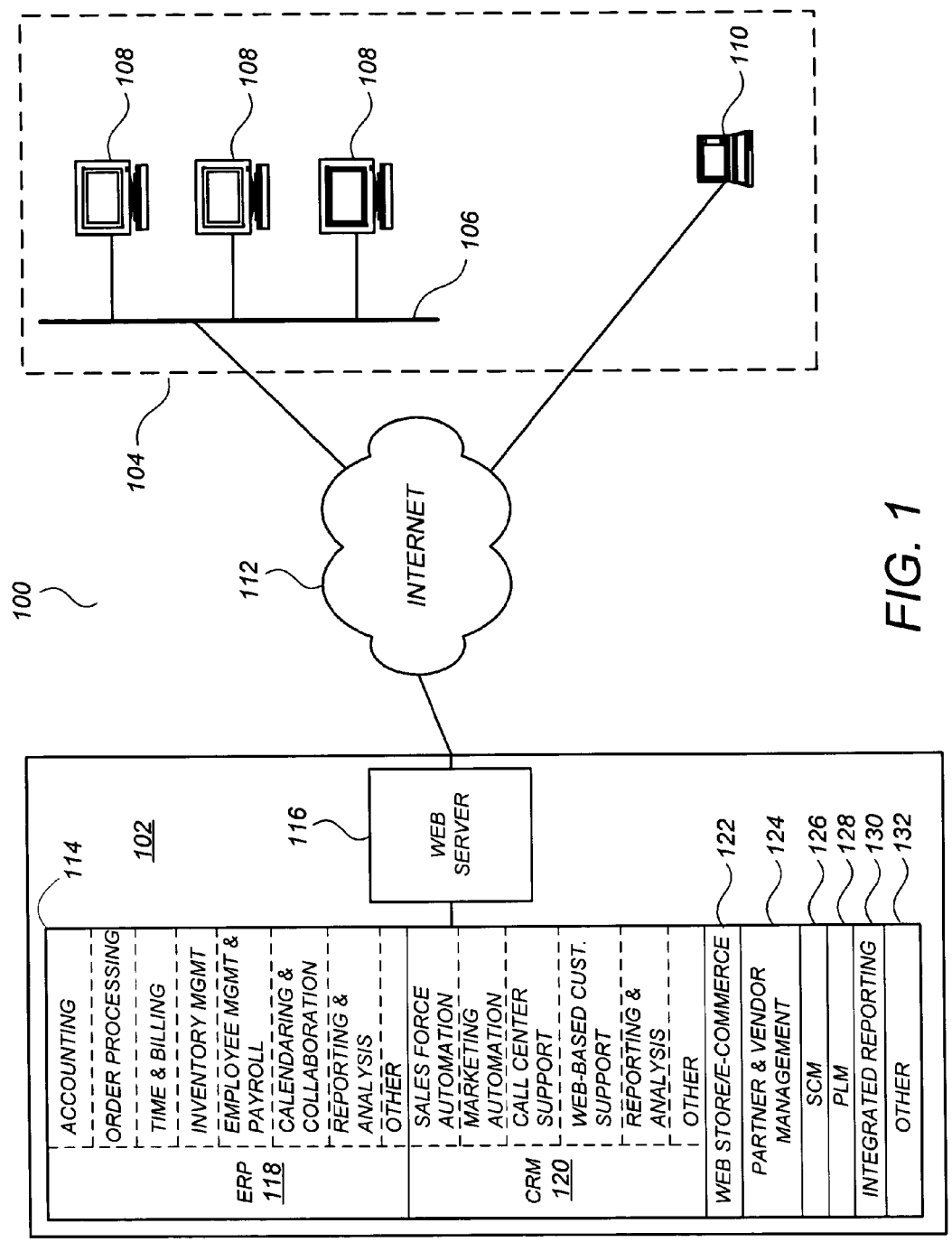
FIG. 1 illustrates a conceptual diagram of a computer network including an enterprise network and an integrated business system according to a preferred embodiment.

FIG. 1 illustrates a conceptual diagram of a network 100 including an integrated business system 102 and an enterprise network 104 into which the features and advantages of one or more preferred embodiments may be realized. Enterprise network 104 is associated generally with a business enterprise that may be as small as a single-employee sole proprietorship or as large as a multinational corporation having many different facilities and internal networks spread across many continents. Alternatively, and in accordance with the advantages of an application service provider (ASP) hosted integrated business system, the business enterprise may comprise no dedicated facilities or business network at all, provided that its end users have access to an internet browser and an internet connection. For simplicity and clarity of explanation, the enterprise network 104 is simply represented by an on-site local area network 106 to which a plurality of personal computers 108 is connected, each generally dedicated to a particular end user although such dedication is not required, along with an exemplary remote user computer 110 that can be, for example, a laptop computer of a traveling employee having internet access through a hotel, coffee shop, a public Wi-Fi access point, or other internet access modality. The end users associated with computers 108 and 110 may also each possess a personal digital assistant (PDA) such as a Blackberry, Palm, Handspring, or other PDA unit having wireless internet access and/or cradle-based synchronization capabilities. Users of the enterprise network 104 interface with the integrated business system 102 across the Internet 112.

Integrated business system 102, which is preferably hosted by a dedicated third party ASP, comprises an integrated business server 114 and a web server 116 coupled as shown in FIG. 1. It is to be appreciated that either or both of the integrated business server 114 and the web server 116 may actually be implemented on several different hardware systems and components even though represented as singular units in FIG. 1. Integrated business server 114 comprises an ERP functionality as represented by ERP module 118, and further comprises a CRM functionality as represented by CRM module 120. It is to be appreciated that identification herein of business functionalities with modules does not limit the scope of the preferred embodiments to segregated units thereof. In many preferred embodiments the ERP module 118 may share methods, libraries, databases, subroutines, variables, etc., with CRM module 120, and indeed ERP module 118 may be intertwined with CRM module 120 into a larger integrated code set without departing from the scope of the preferred embodiments.

It is to be appreciated that FIG. 1 is a simplified conceptual illustration presented so as to clearly describe the preferred embodiments herein. A variety of computing, storage, and networking hardware associated with the enterprise network 104 and the integrated business system 102, such as e-mail servers, databases, application servers, internet gateways, internal and external routers, security devices, internet service provider facilities, and related software protocols and methods necessary for operation are known in the art and need not be detailed here. Examples of such known computing, storage, and networking hardware can be found, for example, in US 2002/0152399A1 and US 2002/0169797A1, which are incorporated by reference herein.

Similarly, in view of the present disclosure, a person skilled in the art would be able to construct software packages capable of achieving the business data communication, presentation, input, and editing functionalities described herein without undue experimentation, using publicly available programming tools and software development platforms. When running in the user's browser, web pages generated according to the preferred embodiments implement a client-side application that dynamically presents business information to the user and dynamically communicates with the web server 116. Preferably, the web pages are implemented using only the following file types that comprise a standard web page: JavaScript (.js), Java Server Pages (.jsp), stylesheets (.css), images (.gif, .jpg, etc.), and HTML files. Web pages requiring run-time downloads such as the Java Virtual Machine are less preferred, but are not necessarily outside the scope of the preferred embodiments. It has been found preferable to generate the preferred web pages according to the capabilities of Microsoft. Internet Explorer, Version 5.5 and greater, which include the ability to leverage features of DOM (Document Object Model) 2.0, such web pages achieving the optimized user interface described herein without requiring run-time downloads.

It has been found preferable to implement the list editing and other data manipulation functionalities described herein without using browser frames. Generally speaking, it is observed that frame refreshes are tantamount to page refreshes from a network traffic viewpoint, a user perception viewpoint, and a programming viewpoint. Unless indicated otherwise herein, if an operation is specified as not requiring a page refresh, it is likewise to be inferred that the operation does not require a frame refresh.

Programming techniques that can be used to achieve the functionalities described herein can be found, for example, in Ray, D. and Ray, E., *Mastering HTML and XHTML*, SYBEX, Inc. (2002), and in Goodman, D., *JavaScript Bible: Gold Edition*, Hungry Minds, Inc. (2001). Security considerations can also be accommodated using known methods based, for example, on HTTPS (Hypertext Transfer Protocol Secure), a secure version of HTTP using certificates that can uniquely identify the server and the client and that encrypt all communication between them.

According to one preferred embodiment, the integrated business system 102 is similar to one used by NetSuite, Inc. (formerly NetLedger, Inc.) of San Mateo, Calif. providing the hosted business services NetSuite™, Oracle® Small Business Suite, NetCRM™, and NetERP™, descriptions of which can be found at www.netsuite.com (formerly www.netledger.com). In a preferred embodiment similar to NetSuite™, the ERP module 118 comprises an accounting module, an order processing module, a time and billing module, an inventory management module, an employee management and payroll module, a calendaring and collaboration module, a reporting and analysis module, and other ERP-related modules. The CRM module 120 comprises a sales force automation (SFA) module, a marketing automation module, a contact list module (not shown), a call center support module, a web-based customer support module, a reporting and analysis module, and other CRM-related modules. The integrated business server further 114 further provides other business functionalities including a web store/e-commerce module 122, a partner and vendor management module 124, and an integrated reporting module 130. These functionalities are seamlessly integrated and executed by a single code base accessing one or more integrated databases as necessary. In another preferred embodiment, an SCM module 126 and PLM module 128 is provided. Web server 116 is configured and adapted to interface with the integrated business server 114 to provide web-based user interfaces to end users of the enterprise network 104.

In an alternative preferred embodiment (not shown), one or more of the above business modules may be implemented by functionally separate servers and/or platforms that communicate with each other and with an integration server (not shown) over a LAN, a WAN, or the Internet. Protocols that may be used to facilitate inter-server communications include smbXML and qbXML.

Figure 2:
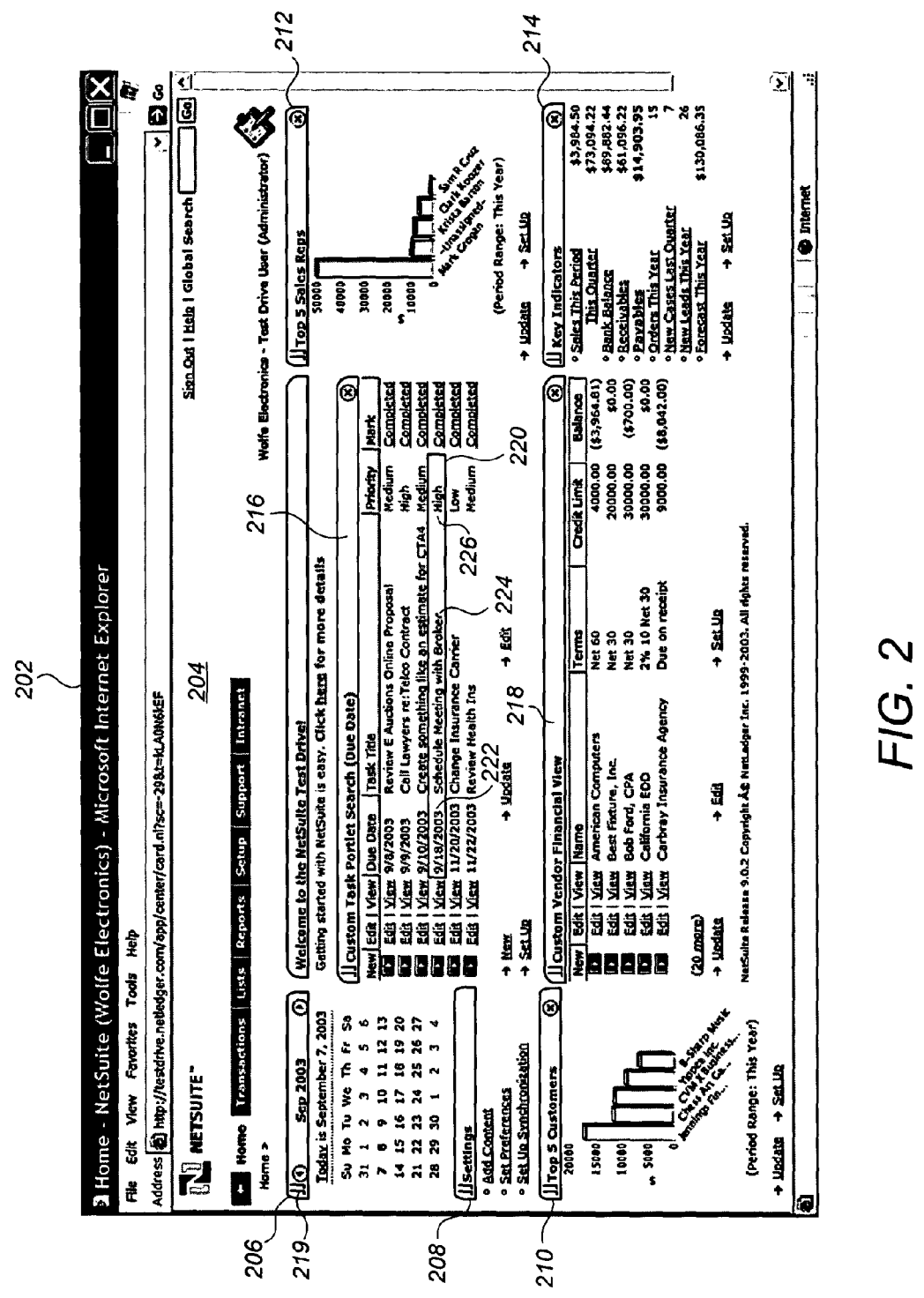

FIG. 2 illustrates a browser window 202 displaying a dashboard 204 of an interactive browser-based user interface according to a preferred embodiment. In one preferred embodiment, the dashboard 204 is similar to an "executive dashboard" feature of the NetSuite™ release currently offered by NetSuite, Inc. (formerly NetLedger, Inc.) of San Mateo, Calif. as of the filing date of the present application. In one or more preferred embodiments described herein, interactive list editing features are described that are similar to an "extreme list editing" feature of a subsequent NetSuite™ release intended for public release after the filing date of the present application.

Dashboard 204 comprises a plurality of portlets providing and/or allowing access to a variety of different ERP, CRM, and other capabilities, including: a calendar application portlet 206, a settings portlet 208, and business result portlets 210, 212, and 214. Each portlet is provided with a repositioning icon on its title bar, such as icon 219, that can be clicked and dragged to allow dynamic portlet rearranging as described in Ser. No. 10/406,915, supra. Dashboard 204 further comprises a search results portlet 216 displaying up-to-date results for one or more saved search requests, and a custom vendor financial view portlet 218, both including list data and drill-down links to underlying data views. The search results portlet 216 comprises a plurality of records such as the record 220. Record 220 comprises a plurality of data elements or cells including a date cell 222, a text cell 224, and a priority level cell 226. The search results portlet 216 and the custom vendor financial view portlet 218 are each easily editable according to the preferred embodiments described herein.

Figure 3:
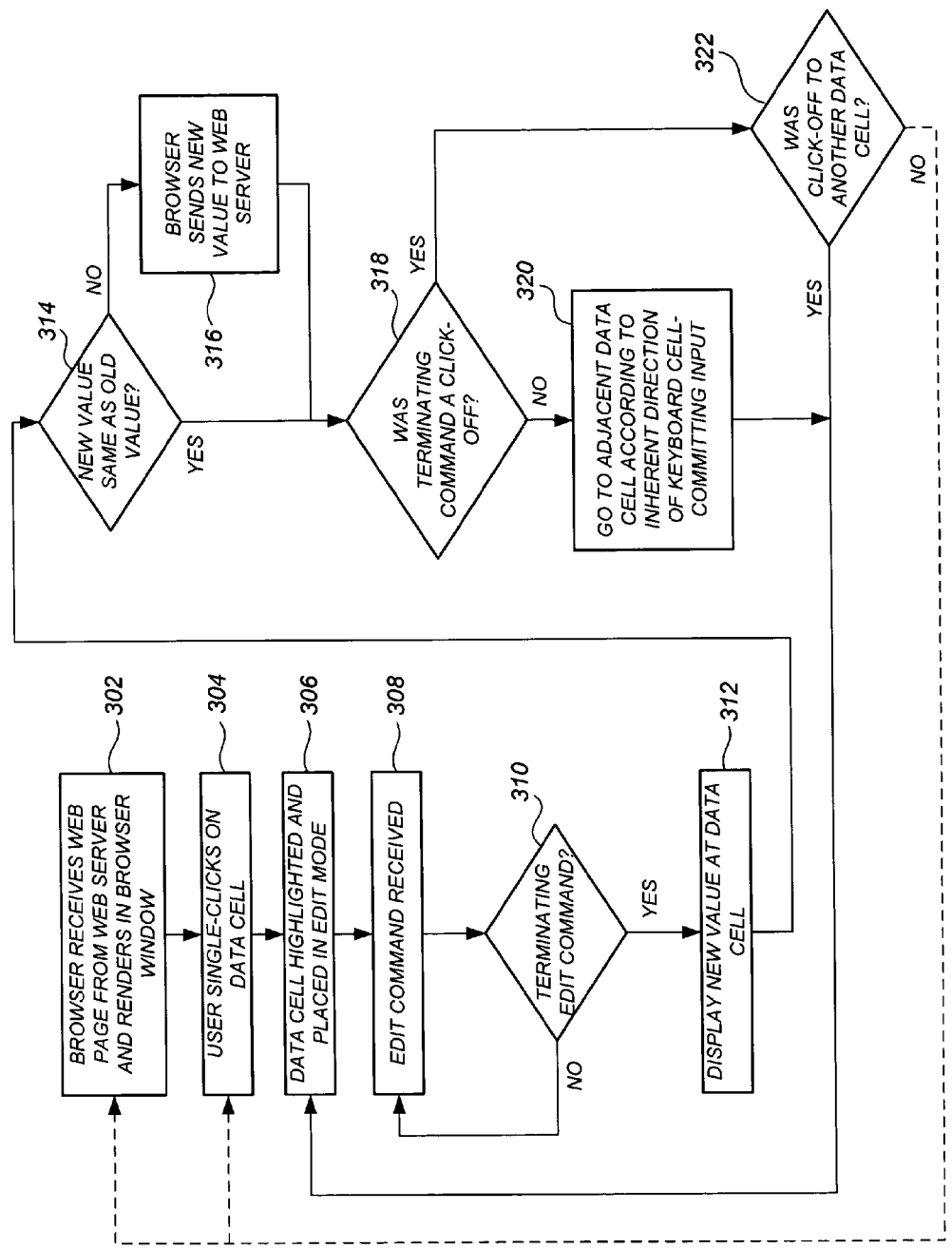
FIG. 3 illustrates steps in an optimized data input and/or editing experience in a browser-based user interface of an integrated web-based business information system according to a preferred embodiment.

FIG. 3 illustrates steps in an optimized data input and/or editing experience in a browser-based user interface of an integrated web-based business information system according to a preferred embodiment, including steps for single-click instantiation of cell editing in a table displayed by a browser, and including steps for single off-click or keyboard-commit instantiation of cell-wise data transfers. FIGS. 4-9 illustrate a conceptual diagram of a user computer 110 coupled to a web server 116 across a network 112, along with a portion of the browser window 202 from FIG. 2 being shown thereon. FIGS. 4-9 further illustrate a keyboard 402 and mouse 404 associated with the user computer 110 for illustrating keyboard inputs and mouse clicks associated with the steps of FIG. 3. It is to be appreciated that the mouse movements and clicks described herein have direct equivalents in the event that a touch-screen display is used, with single screen taps being equivalent to single mouse clicks, which are within the scope of the preferred embodiments. Likewise, single-click inputs can be achieved by other point-and-click input devices such as touchpads, "eraserhead" pointers, and joysticks. References herein to mouse movements and mouse clicks are also to be considered as references to such types of point-and-click devices and their equivalents.

Figure 4:
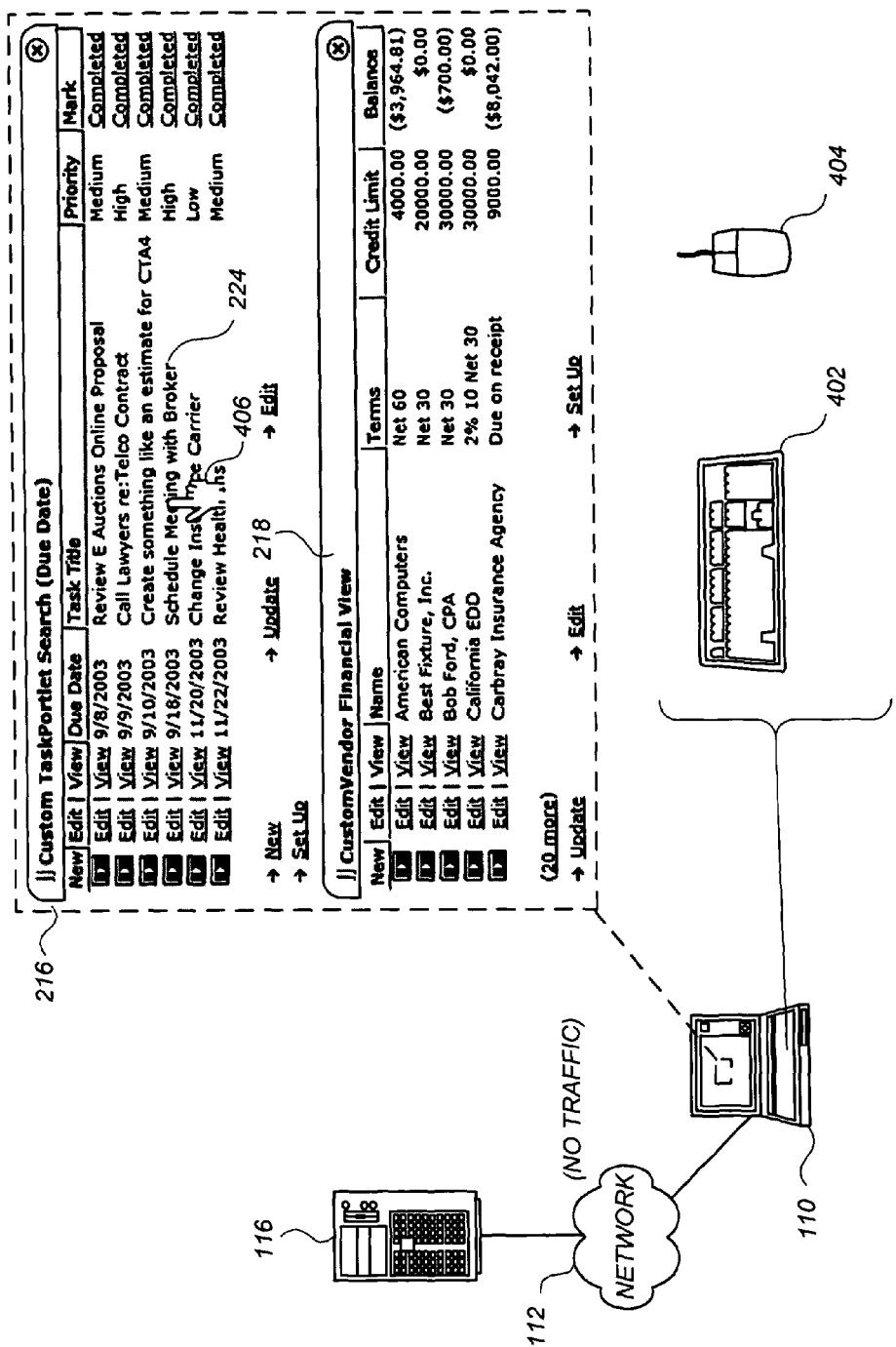
FIGS. 4-9 illustrate conceptual diagrams of a browser-based user interface, user input occurrences associated with the browser-based user interface, and network communication occurrences associated therewith corresponding to various steps outlined in FIG. 3.
Figure 5:
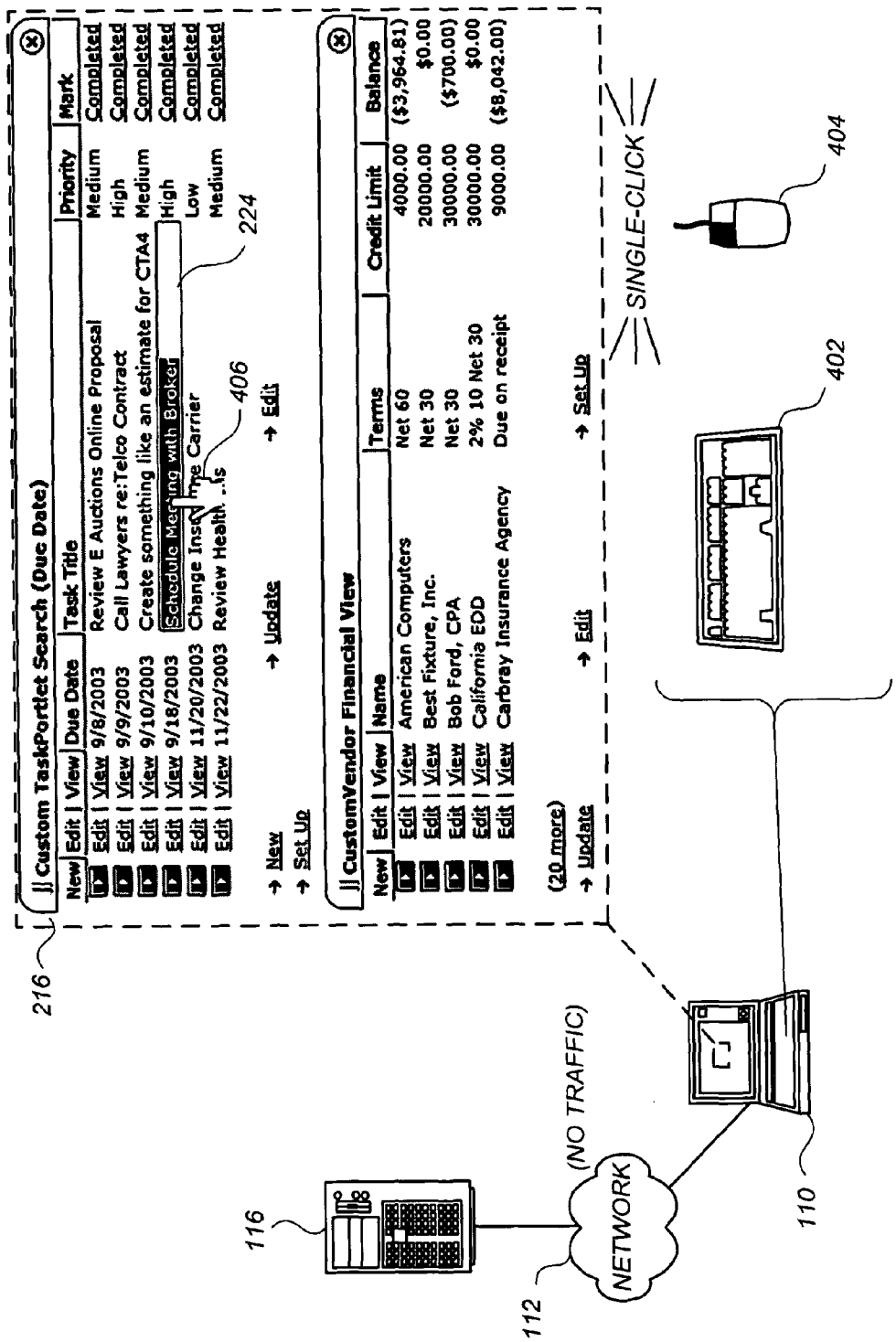

At step 302, a browser at user computer 110 receives a web page from web server 116 and renders it in the browser window. With reference to FIG. 4, the user rolls the cursor 406 over to a data cell 224, the cursor taking the familiar form of a hand to indicate that the data cell 224 is editable. At step 304, the user single-clicks the data cell 224 (see FIG. 5), and at step 306 the data cell 224 is highlighted and placed into edit mode without requiring any further intervening user input, the highlighted data cell 224 also being shown in FIG. 5.

Figure 6:
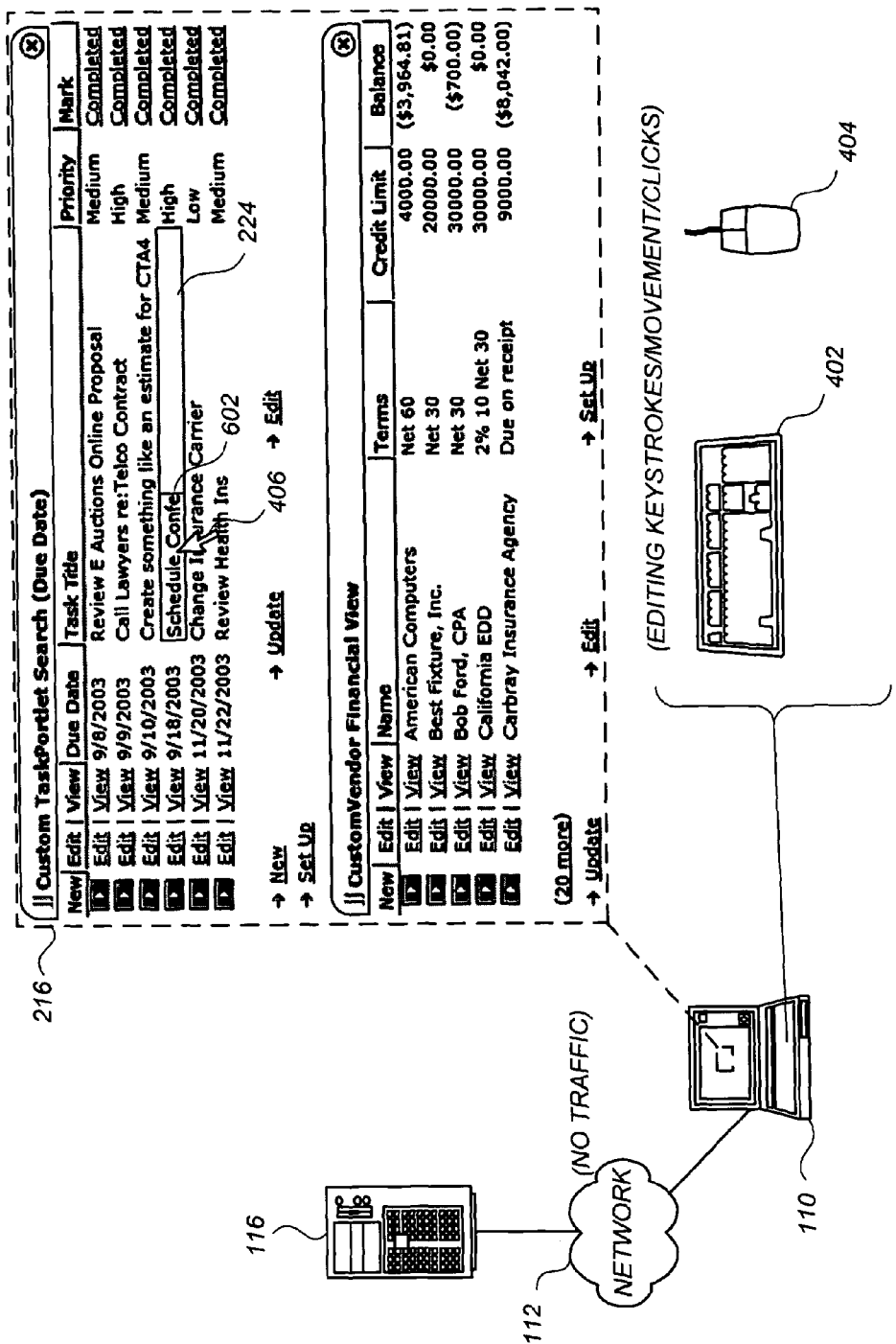

At steps 308 and 310, editing commands are received (see FIG. 6) for changing the contents of the data cell 224. As indicated in FIG. 6, a text input cursor 602 is provided in the data cell 224 to guide user input. In other preferred embodiments, various kinds of multiple-choice selection menus (e.g., yes/no, high/medium/low, country or state selection lists, Mr./Mrs./Ms./Dr. selection lists, etc.) are provided.

Data cell editing ends upon receipt of a terminating edit command, wherein at step 312 the new data value is displayed, and wherein at steps 314-316 the new value is transmitted to the web server, without requiring a page refresh, if that new value is different than the old value.

Figure 7:
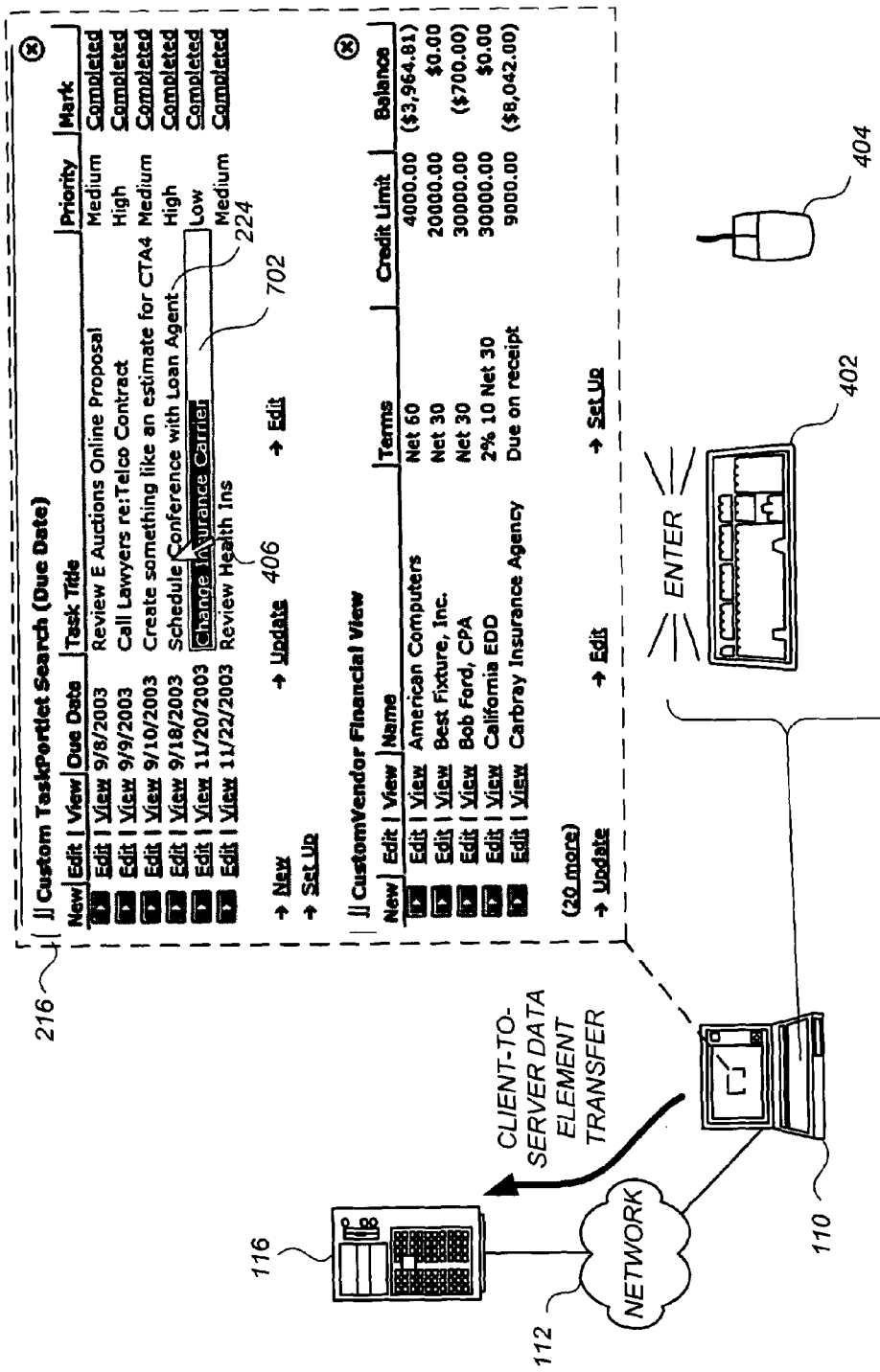
Figure 8:
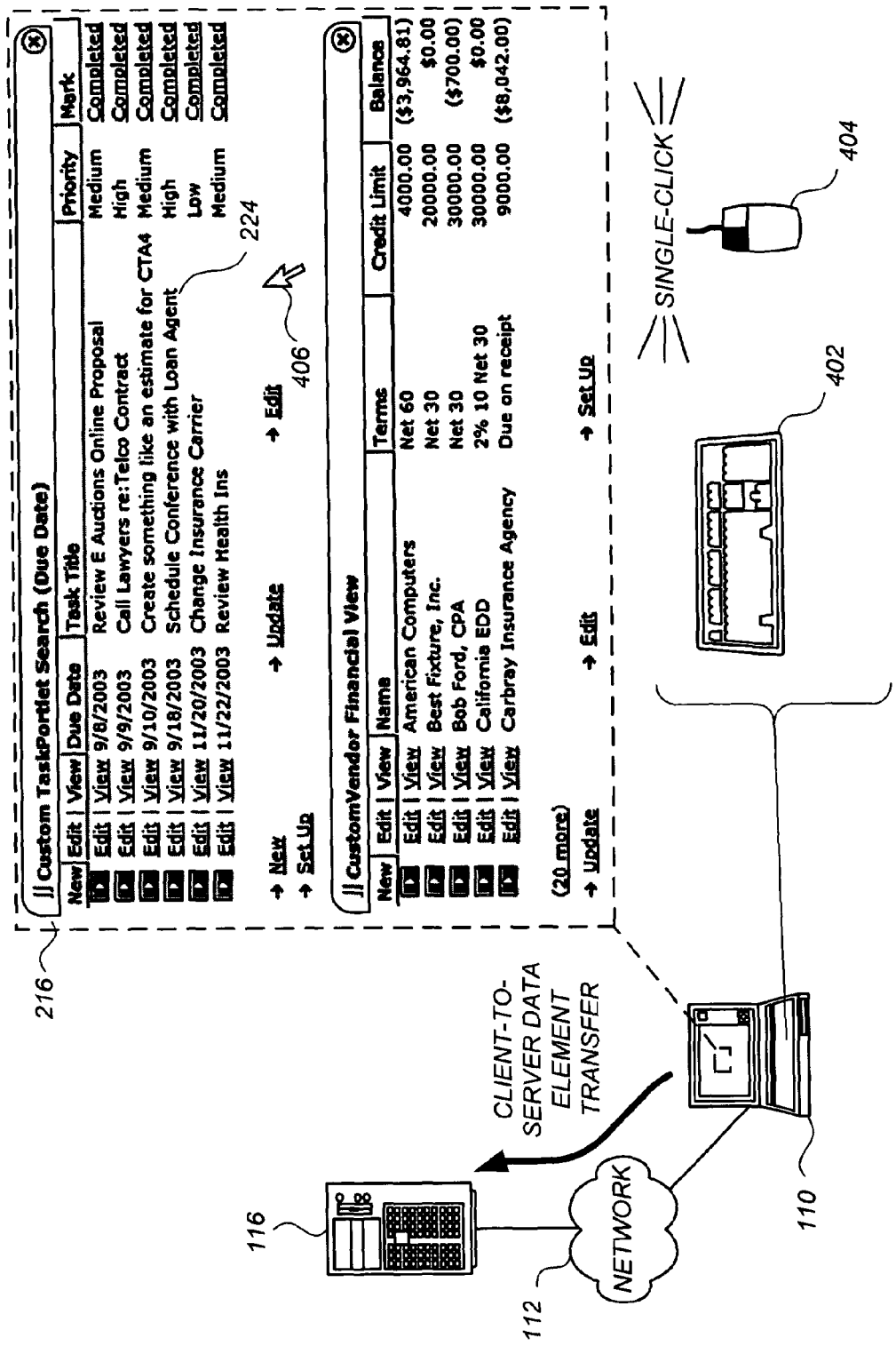
Figure 9:
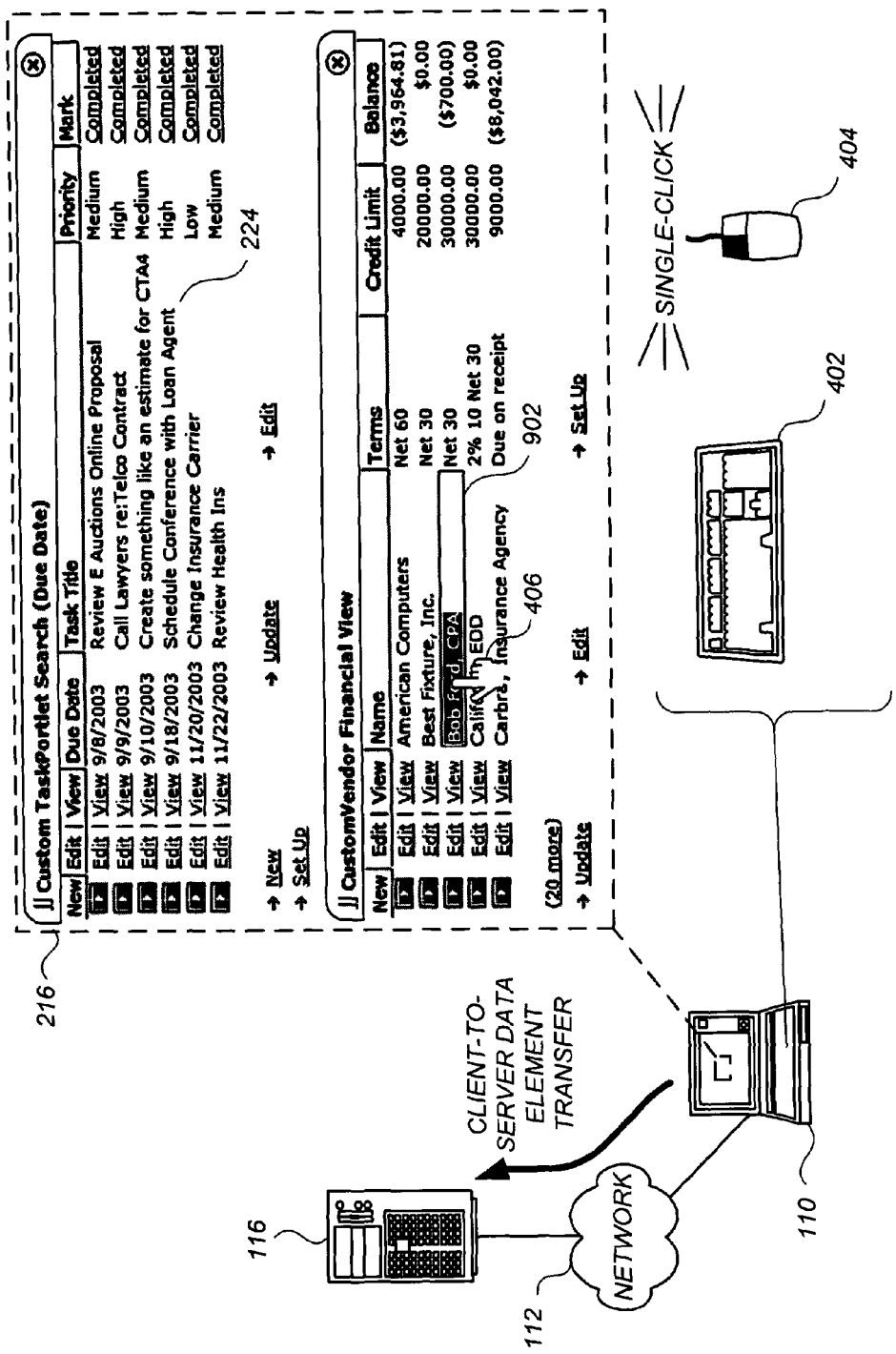

FIGS. 7-9 illustrate different kinds of terminating edit commands according to the preferred embodiments. FIG. 7 illustrates the use of a terminating input command that is a predetermined cell-committing keyboard input, comprising the pressing of the ENTER key on the keyboard. In this case, the data cell 702 directly below the data cell 224 is immediately selected and highlighted for editing, without requiring any intervening user input. This corresponds to a branch from step 318 to 320 in FIG. 3, which then returns to the step 306 for the subsequently selected data cell 702.

According to a preferred embodiment, different predetermined cell-committing keyboard inputs are associated with inherent directions for immediate selection/highlighting of a subsequent data cell for editing. The ENTER key is associated with a DOWN direction, as illustrated in FIG. 7. By way of further non-limiting example, other predetermined cell-committing keyboard inputs may include: a TAB command having a predetermined inherent direction of RIGHT; a SHIFT-TAB command having a predetermined inherent direction of LEFT; an UP ARROW command having a predetermined inherent direction of UP; and a DOWN ARROW command having a predetermined inherent direction of DOWN.

According to a preferred embodiment, client-side validation is performed by the browser prior to sending a newly entered data value to the web server 116. Client-side validation comprises a preliminary "sanity check" for data, such as for ensuring that allowable data types are provided. Erroneous inputs recognized during the client-side validation cause an error pop-up box to be displayed, which can be programmed using known JavaScript methods, and are not sent to the web server 116. Thus, by way of example, if a decimal value is entered into a "date" field, the client-side validation feature will causes an error pop-up box to be displayed instructing the user to enter the proper data type, and prevents that decimal value from being sent to the web server 116. The user can then clear the error box and re-enter the data.

According to another preferred embodiment, dynamic server-side validation is performed by the web server 116 after receiving the new data value, in conjunction with the integrated business system 102 as necessary, to perform higher-level error checking. By way of example, if there is a new "end date" assigned to a given record that has already been assigned a "start date", and if the "end date" erroneously falls before the "start date", this error is recognized. A dynamic communication, not requiring a browser refresh, is transmitted back from the web server 116 to the browser, and the browser displays an error pop-up box to the user advising them of the error.

FIG. 8 illustrates the use of a terminating input command that is a click-off of cursor 406 to a location in the browser window 202 that is (a) not on the data cell 224, and (b) not on any other editable data cell. This corresponds to a branch in FIG. 3 from step 318 to step 322 and back, after any number of interim inputs, to either step 302 (if a page-committing input is received at some point) or to step 304 otherwise.

FIG. 9 illustrates the use of a terminating input command that is a click-off of cursor 406 to a location in the browser window 202 that is on another editable data cell 902, wherein the data cell 902 is immediately selected and highlighted for editing, without requiring any intervening user input, even where the data cell 902 is in a different table than the data cell 224. This corresponds to a branch in FIG. 3 from step 318 to step 322 and back to step 306 for the newly selected data cell 902.

Figure 10:
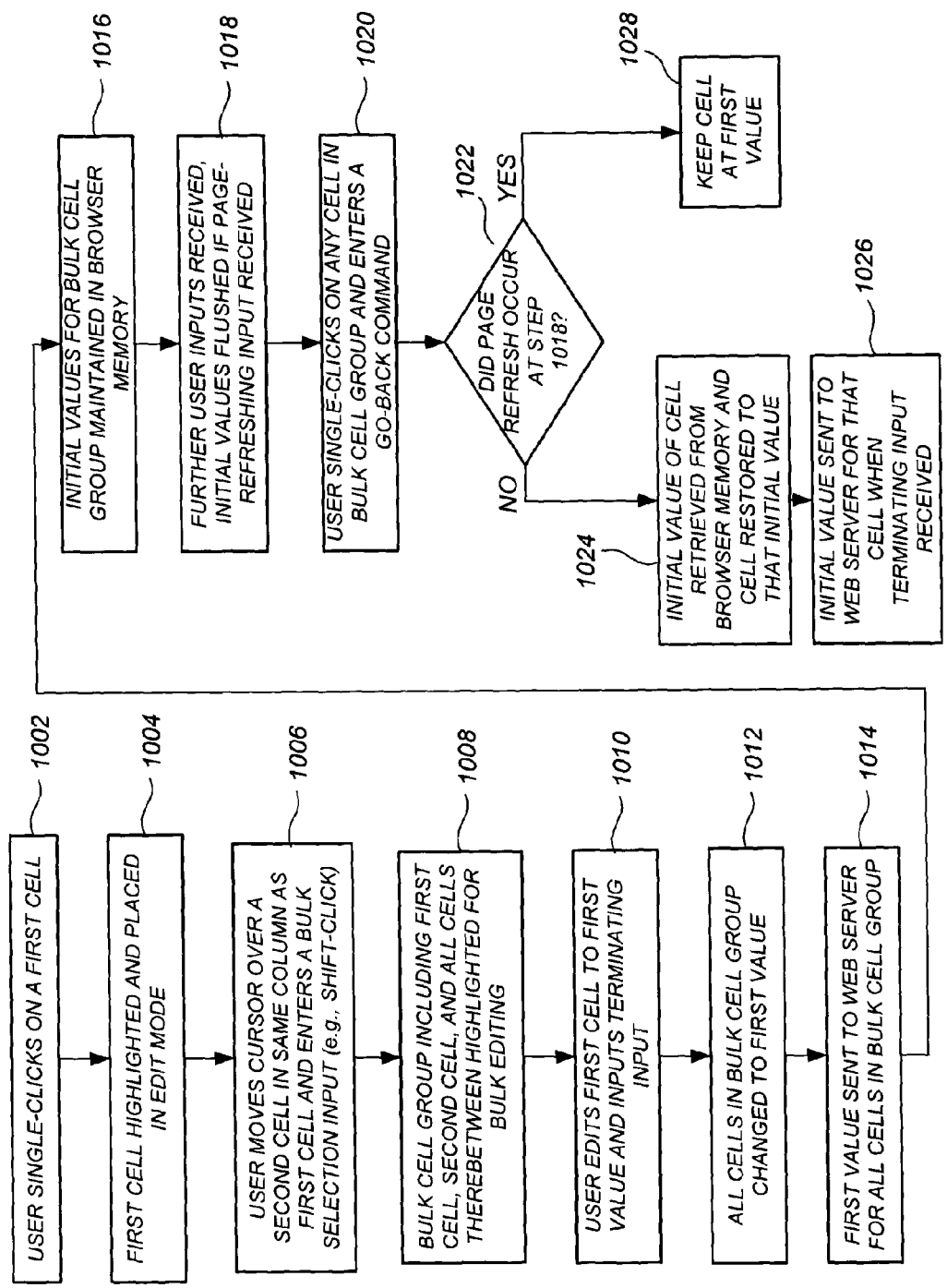
FIG. 10 illustrates steps in an optimized data input and/or editing experience in a browser-based user interface of an integrated web-based business information system according to a preferred embodiment.
Figure 13:
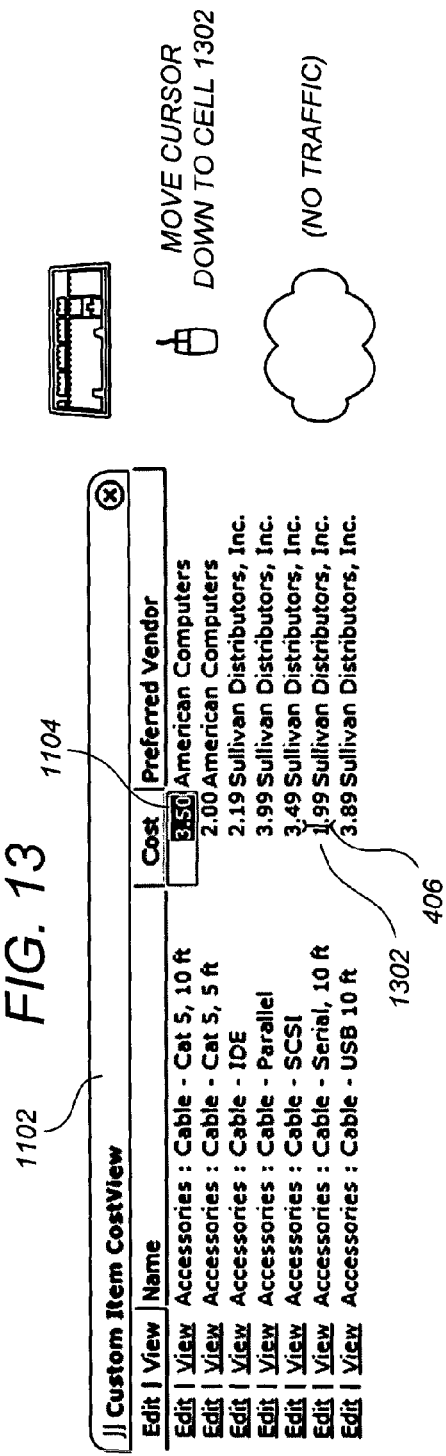

FIG. 10 illustrates steps in an optimized data input and/or editing experience in a browser-based user interface of an integrated web-based business information system according to a preferred embodiment, including bulk editing allowing group modification of data elements across a plurality of adjacently-displayed records, and including client-side, location-based caching of old cell values allowing selective go-back for any edited or bulk-edited cell, in any order desired by the user, prior to a page-refreshing input event. FIGS. 11-19 illustrate a conceptual diagram of a table listing 1102 displayed in a browser window of the user computer 110, along with conceptual displays of keyboard input, mouse input, and network traffic flow analogous to those shown supra for FIGS. 4-9.

Figure 14:
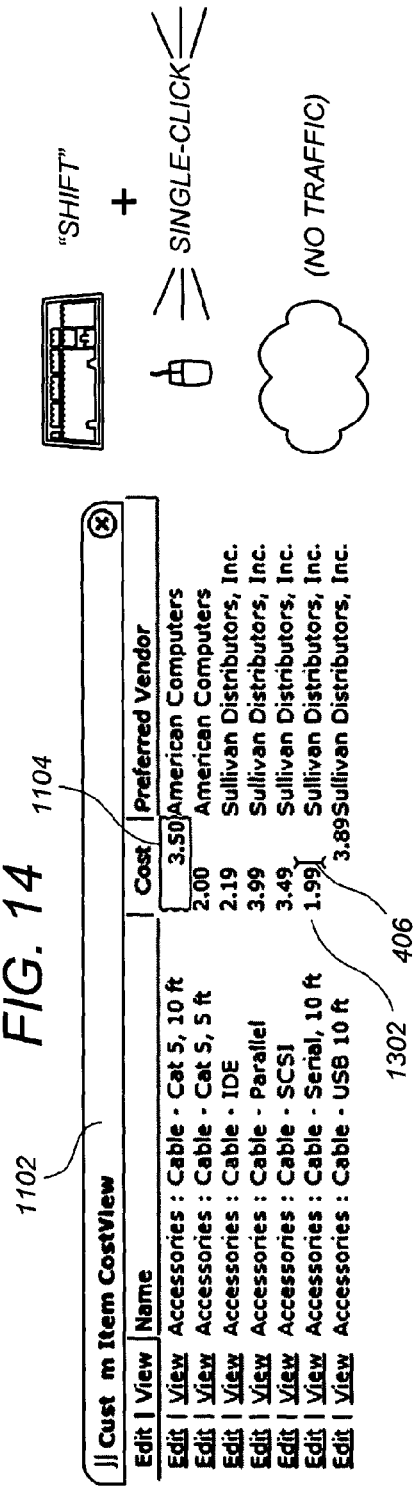
Figure 17:
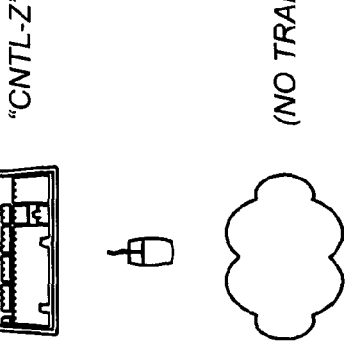
Figure 18:
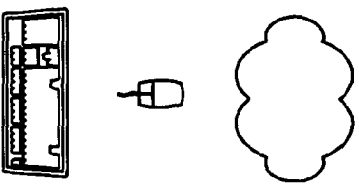
Figure 19:
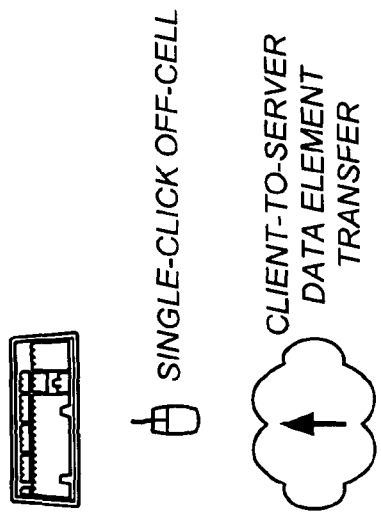

The table 1102 may be a sole table listed in the browser window 202, or may be one of many portlets being displayed in a dashboard configuration in the browser window 202. At step 1002, the user positions the cursor 406 over a first cell 1104 (see FIG. 11) and provides a single-click input. At step 1004, the first cell 1104 is highlighted and placed in an EDIT mode (see FIG. 12). At step 1006, the user moves the cursor 406 over a second cell (see FIG. 13, cell 1302) and enters a bulk selection input, such as a SHIFT-CLICK, whereupon at step 1008 a bulk cell group including the first cell 1104, the second cell 1302, and all cells therebetween (see FIG. 14) are selected and highlighted for bulk editing. In the example of FIG. 14, the highlighting for bulk editing is achieved by left-justifying the initially right justified data elements, although a variety of different highlighting techniques can be used according to the preferred embodiments.

At step 1010, the user edits the first cell 1104 (see FIG. 15) to a first value (e.g., 4.99) and inputs a terminating input as a click-off within the browser window in a non-data-cell area, whereupon at step 1012 all cells in the bulk cell group are changed to the first value and at step 1014 the first value is dynamically sent to the web server for association with all cells in the bulk cell group (see FIG. 16).

In another preferred embodiment, easy group modification of non-adjacently listed records is provided by using a bulk group addition input (such as a CNTL-click) instead of the above SHIFT-click bulk selection. Any set of non-adjacent cells in the same column as the first cell can be added to the bulk editing cell group by placing the cursor over a desired cell and entering the bulk group addition input. Although it would be less efficient when three or more cells are involved, the bulk group addition input (e.g., CNTL-click) can also be used to select adjacent cells for bulk editing instead of the bulk selection input (e.g., SHIFT-click).

At step 1016, initial values for the bulk cell group are maintained in the browser memory, in a manner that associates them with cell locations. At step 1018, further user inputs are received, the initial values being maintained in the browser memory until such time as a page-refreshing input is received, at which time they are flushed from the browser memory.

At step 1020, the user single-clicks on any cell in the bulk cell group (see FIG. 17) and enters a go-back command. At step 1022, if no page-refreshing input was received at step 1018 (i.e., between the bulk editing steps and the go-back command), then at step 1024 the initial value of that cell is retrieved from the browser memory and the cell is restored to that initial value (see FIG. 18), and at step 1026 the initial value is dynamically sent to the web server for that cell upon receipt of a terminating input (see FIG. 19). If there was an intervening page refresh at step 1018, then the cell is kept at the first value (step 1028) that was assigned in the bulk editing steps.

In the above example it is assumed that no intermediate value-changing edits were made to the restored member of the bulk cell group. In a preferred embodiment, the browser maintains a single historical value for each cell that is modified. Thus, if a cell is modified more than once, only the most recent historical value can be restored. In other preferred embodiments, a sequential history is maintained in the browser memory on a per-cell basis, thus allowing restorals to any of the various values entered for that cell since the last page refresh.

One powerful use of bulk editing when used with the web-based business information system according to the preferred embodiments is the ability to change common fields of logically related records using only a single data input for all of the logically related records, rather than the labor-intensive process of changing each record individually. To achieve this, the user may sort a list of records in a way that causes the logically related records to be listed adjacent to each other. By way of example, where a client company having several sales contacts has changed its address, the list of sales contacts can be sorted according to company, thereby causing all of the people for that company to be listed adjacently on the record list. The steps for bulk editing of adjacently-listed records described supra can then be implemented to change the street address, for example, of all of those sales contacts using a single bulk edit.

Figure 20:
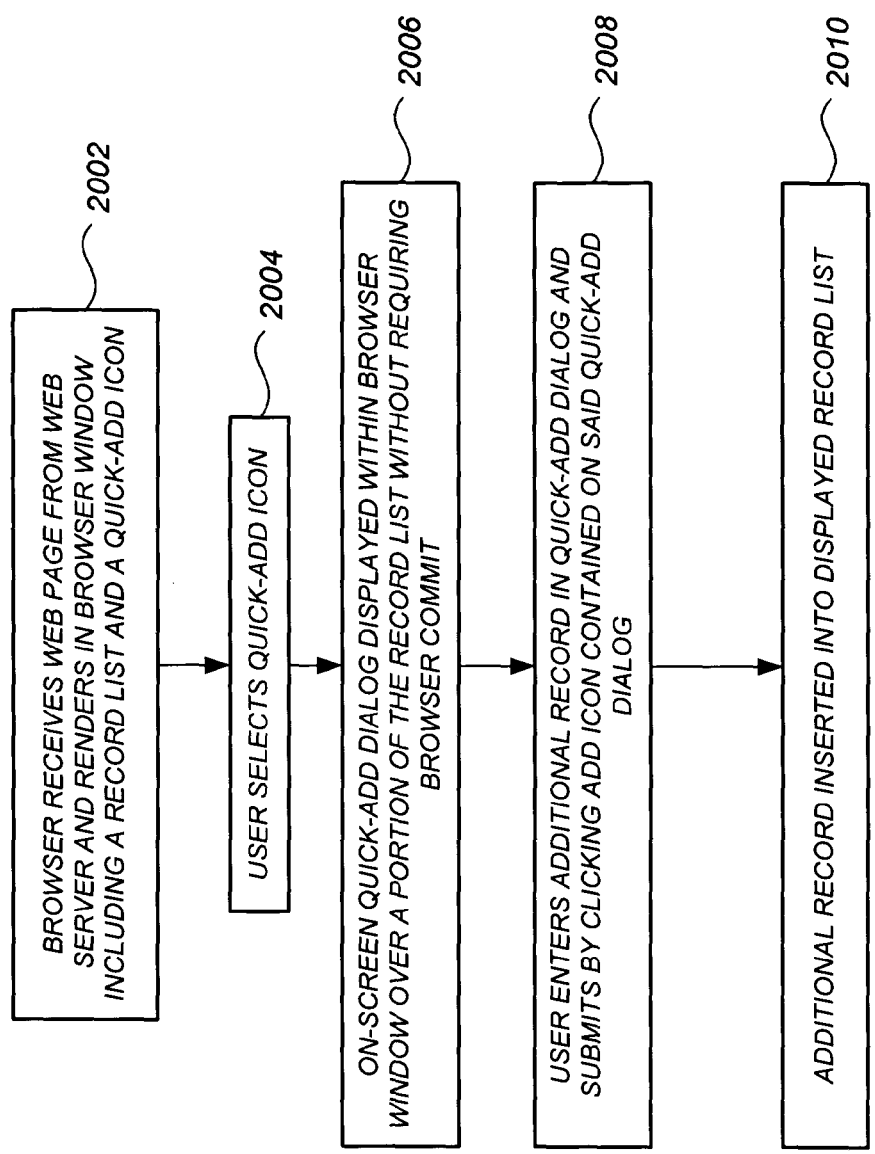
FIG. 20 illustrates steps in an optimized data input and/or editing experience in a browser-based user interface of an integrated web-based business information system according to a preferred embodiment.
Figure 23:
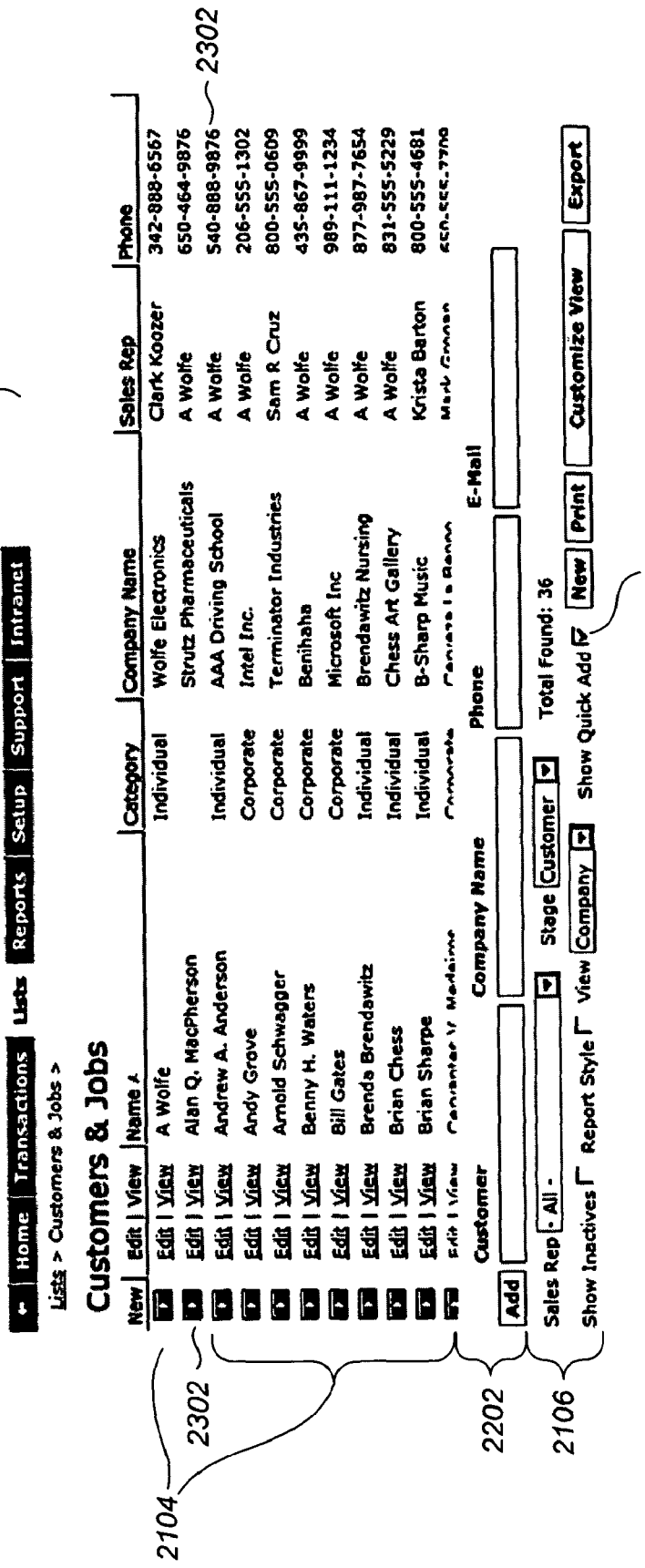

FIG. 20 illustrates steps in an optimized data input and/or editing experience in a browser-based user interface of an integrated web-based business information system according to a preferred embodiment, including a quick-add feature for easily inserting records into a table listing without leaving the table listing itself. With reference to FIG. 21, at step 2002 a web page from the web server is received and rendered in browser window 2102, the display including a record list 2104 and a quick-add icon 2108. At step 2004, the user selects the quick-add icon 2108 causing the browser at step 2006 to display, with reference to FIG. 22, an on-screen quick-add dialog 2202 over a portion of the record list 2104, without requiring a browser commit. At step 2008, the user inputs an additional record in the quick-add dialog 2202. FIG. 22 illustrates the quick-add dialog 2202 as user input for the new record is being completed at cursor position 2204. The user submits the new record to the web server by pressing an ADD icon contained in the quick-add dialog 2202. At step 2010, the new record (see FIG. 23, record 2302) is inserted in the displayed record list. Advantageously, the new record is entered at a location that is in close proximity to the existing record list 2104, and in general column-wise correlation therewith, to facilitate overall ease of data input. In the event that any particular columns are displayed on the record list 2104 not provided for in the quick-add dialog 2204 (for example, "Category" in FIG. 23) that data cell is easily populated using the direct cell-editing features described supra.

Figure 24:
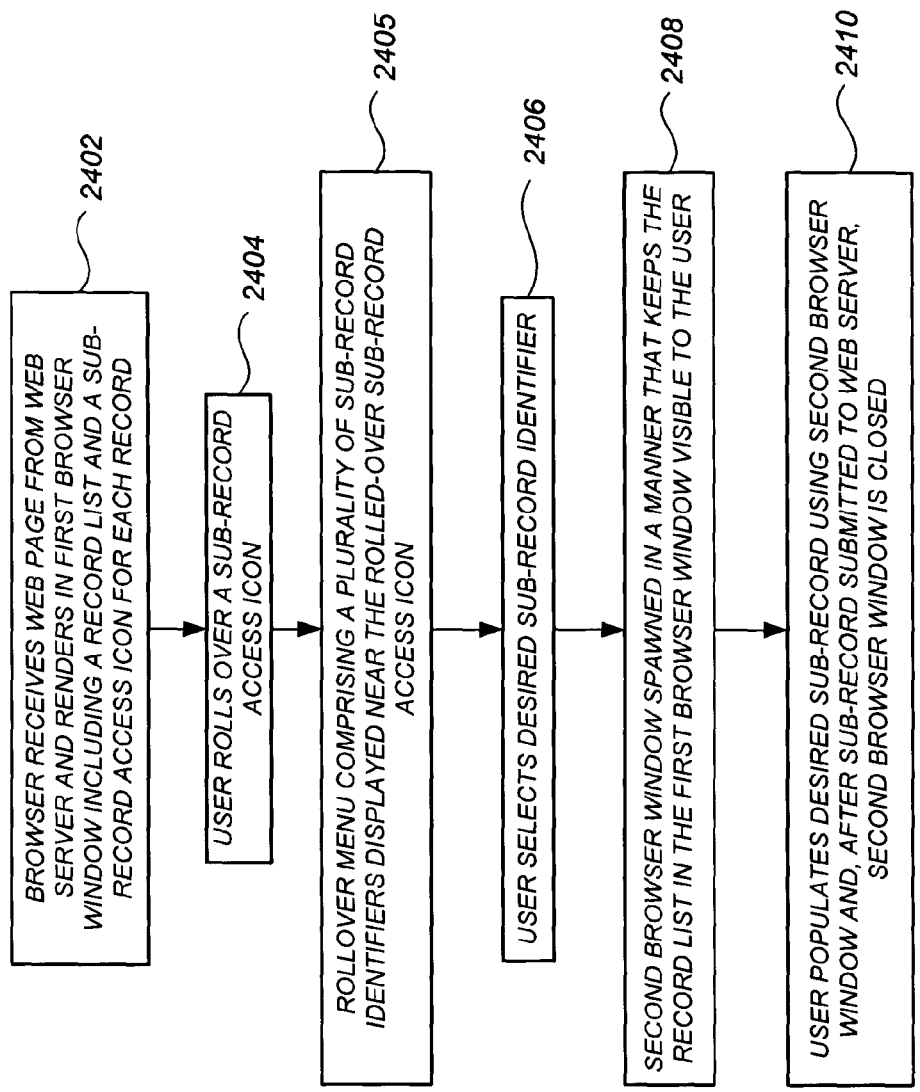
FIG. 24 illustrates steps in an optimized data input and/or editing experience in a browser-based user interface of an integrated web-based business information system according to a preferred embodiment.
Figure 25:
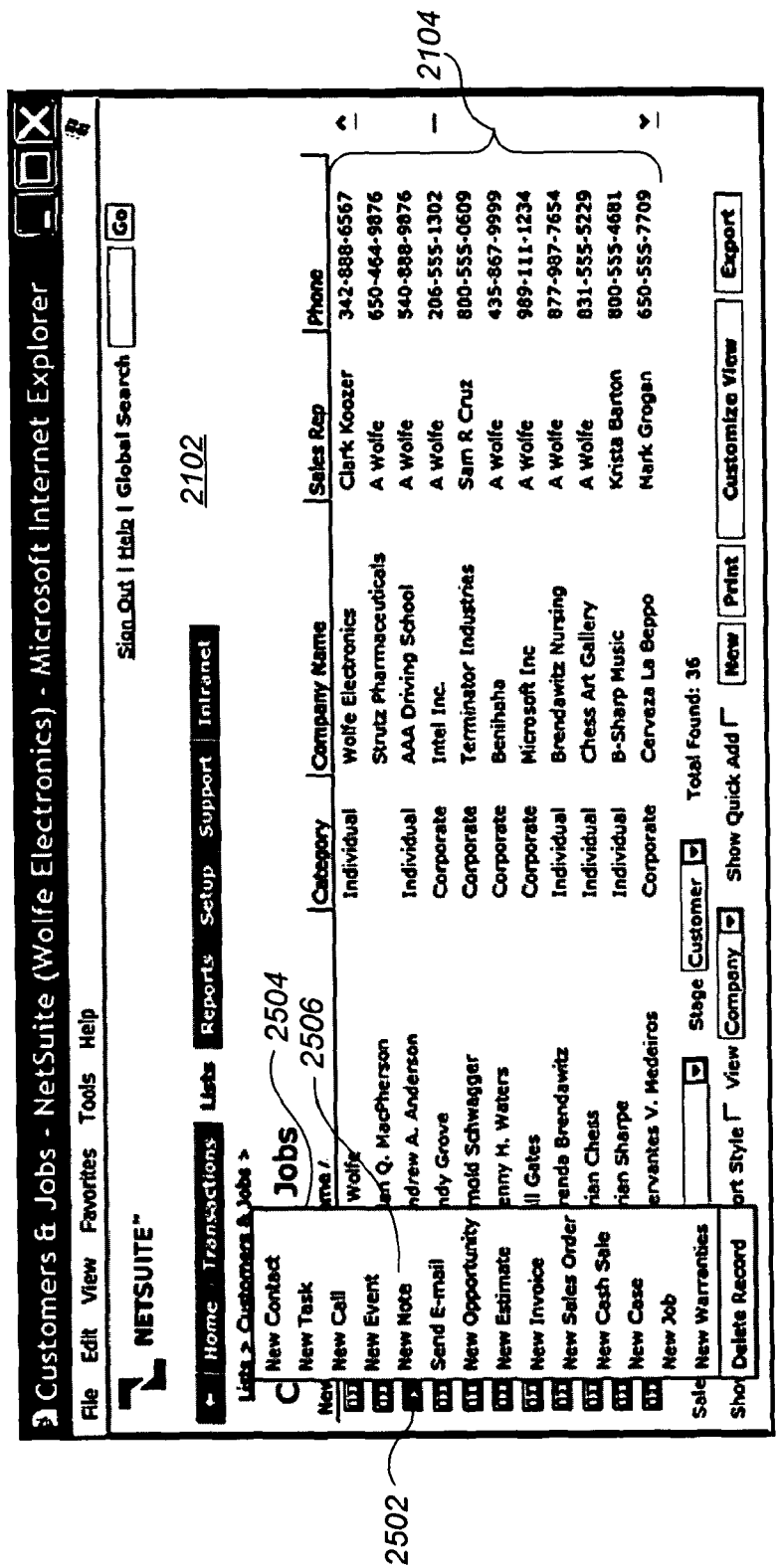

FIG. 24 illustrates steps in an optimized data input and/or editing experience in a browser-based user interface of an integrated web-based business information system according to a preferred embodiment, including allowing easy establishment/modification of sub-records associated with any of a displayed list of records using sub-record access icons, roll-over menus, and auxiliary browser windows. With reference to FIG. 25, at step 2402 a web page from the web server is received and rendered in a first browser window 2102, the display including a record list 2104 and, for each record, a sub-record access icon such as the icon 2502 for the "Andrew A. Anderson" record. At step 2404, the user rolls over the sub-record access icon 2502, whereupon at step 2405 a rollover menu 2504 is displayed comprising a plurality of sub-record identifiers, such as the "New Note" sub-record identifier 2506.

Figure 26:
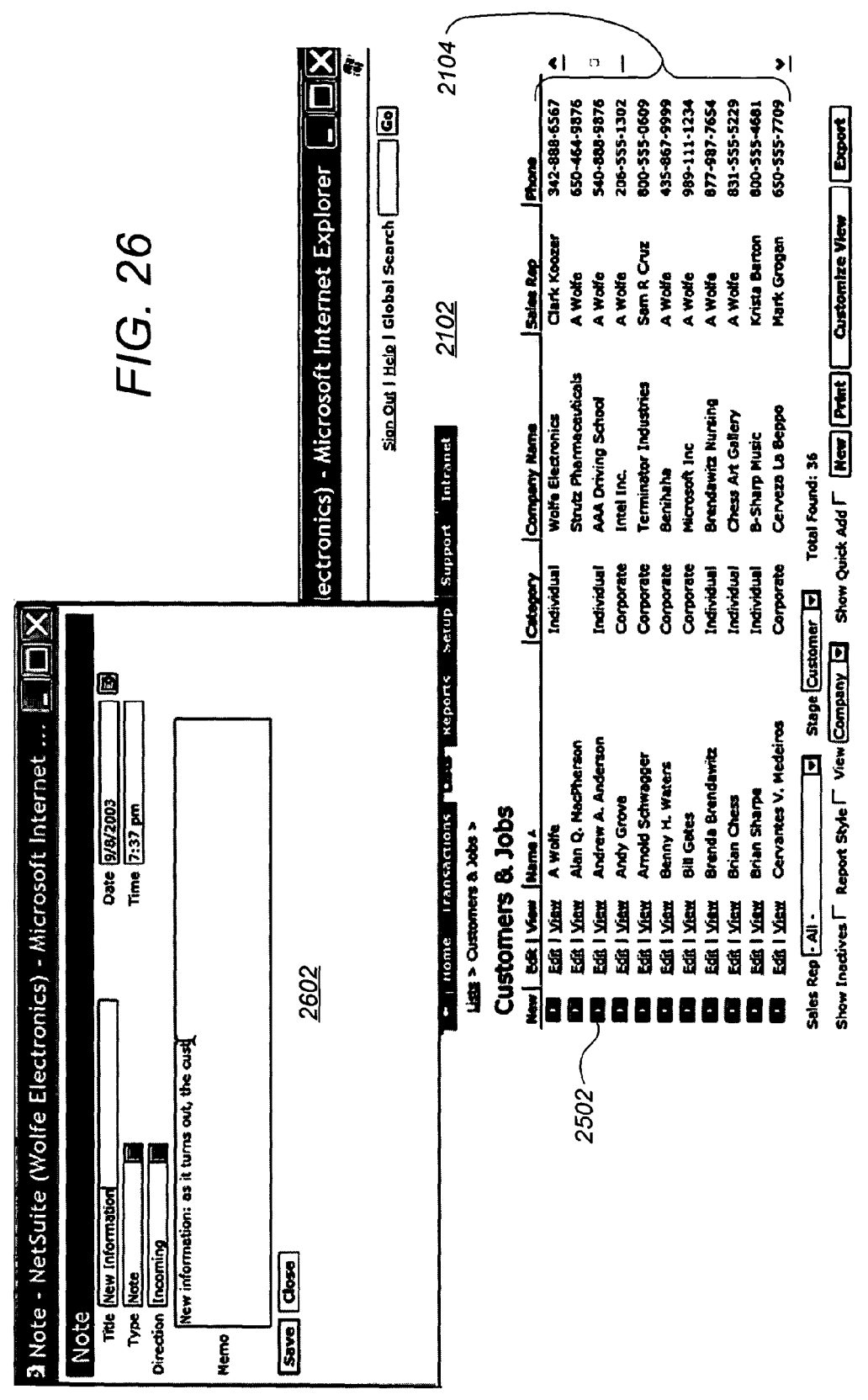

At step 2406, the user selects a desired sub-record identifier, wherein at step 2408, a second browser window (see FIG. 26, browser window 2602) is spawned in the user computer at a location and in a manner that keeps the record list 2104 in the first browser window 2102 visible to the user. At step 2410, the user populates the desired sub-record using the second browser window 2602 and, after the sub-record is submitted to the web server, the second browser window 2602 is closed, preferably automatically. Thus, sub-records associated with a record listed in the first browser window 2102 are established or modified without refreshing that browser window, thereby maintaining continuity of presentation of record list 2104 while also allowing substantive database changes associated with its member records to be entered.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments are not intended to limit their scope, which is limited only by the scope of the claims set forth below.

What is claimed is:

1. In an integrated business system having a web server and at least one database, a method for presenting and editing business data derived from the database, comprising:
   at a user computer, receiving a web page from said web server and displaying a rendering thereof to a user in a browser window, said web page rendering including a table having data cells arranged in rows and columns, each row of data cells corresponding to a common record derived from said database, each column of data cells corresponding to a common data element type stored in said database for said records;
   receiving at a first data cell in said table a single-click from a user to establish a selection of said first data cell;
   responsive to said single-click and without requiring intervening user input, placing said first cell in an EDIT state and visually highlighting said first cell for editing;
   receiving at a second data cell in said table a bulk selection input from the user, said second data cell being in the same column of said table as said first data cell;
   responsive to said bulk selection input, visually highlighting a first data cell group for bulk editing, said first cell group comprising said second cell and any data cells in said table positioned between said first data cell and said second data cell;
   receiving editing commands from the user setting a value of said first data cell to a first value, said editing commands ending with a first terminating input comprising one of (i) a first click-off comprising a click within said browser window outside said first cell, or (ii) a first cell-committing keyboard input; and
   responsive to said first terminating input, setting a value of each data cell in said first data cell group to said first value and transferring said first value to the web server, without requiring a page refresh of the browser, for association with each data cell in said first data cell group in the database.

2. The method of claim 1, wherein said bulk selection input comprises a simultaneous combination of a keyboard SHIFT and a single-click.

3. The method of claim 1, each data cell in said first data cell group comprising an initial value prior to said receiving editing commands, further comprising:
   maintaining the initial value of each data cell in said first data cell group in a memory of said user computer associated with said browser;
   receiving a subsequent user selection of any of said first data cell or said first data cell group;
   receiving a go-back command from the user; and
   responsive to said go-back command, retrieving the initial value corresponding to said subsequently selected data cell, resetting the value of said subsequently selected data cell to said initial value, and transferring said initial value to the web server, without requiring a page refresh of the browser, for storage in association with said subsequently selected data cell.

4. The method of claim 1, each data cell in said first data cell group comprising an initial value prior to said receiving editing commands, further comprising:
   maintaining the initial value of each data cell in said first data cell group in a memory of said user computer associated with said browser;
   subsequent to said first terminating input, receiving a plurality of user inputs in said browser unrelated to said first data cell or said first data cell group;
   receiving a subsequent user selection of any of said first data cell or said first data cell group;
   receiving a go-back command from the user; and
   if said plurality of unrelated user inputs resulted in a page refresh prior to said go-back command, keeping said subsequently selected data cell at said first value;
   if said plurality of unrelated user inputs did not result in a page refresh prior to said go-back command, retrieving the initial value corresponding to said subsequently selected data cell, resetting the value of said subsequently selected data cell to said initial value, and transferring said initial value to the web server, without requiring a page refresh of the browser, for storage in association with said subsequently selected data cell.

5. In an integrated business system having a web server and at least one database, a method for presenting and editing business data derived from the database, comprising:
   at a user computer, receiving a web page from said web server and displaying a rendering thereof to a user in a browser window, said web page rendering including a table having data cells arranged in rows and columns, each row of data cells corresponding to a common record derived from said database, each column of data cells corresponding to a common data element type stored in said database for said records;

receiving at a first data cell in said table a single-click from a user to establish a selection of said first data cell;

responsive to said single-click and without requiring intervening user input, placing said first cell in an EDIT state and visually highlighting said first cell for editing;

receiving at a each of a plurality of other selected data cells in said table a bulk group addition input from the user, said subsequently selected data cells being in the same column of said table as said first data cell, and visually highlighting each of said plurality of other selected data cells as said bulk group addition input is received, said first data cell and said other selected data cells forming a first data cell group for bulk editing;

receiving editing commands from the user setting a value of said first data cell to a first value, said editing commands ending with a first terminating input comprising one of (i) a first click-off comprising a click within said browser window outside said first cell, or (ii) a first cell-committing keyboard input; and responsive to said first terminating input, setting a value of each data cell in said first data cell group to said first value and transferring said first value to the web server, without requiring a page refresh of the browser, for association with each data cell in said first data cell group in the database.

6. The method of claim 5, wherein said bulk group addition input comprises a simultaneous combination of a keyboard CNTL and a single-click.

7. The method of claim 5, each data cell in said first data cell group comprising an initial value prior to said receiving editing commands, further comprising:

maintaining the initial value of each data cell in said first data cell group in a memory of said user computer associated with said browser;

receiving a subsequent user selection of any of said first data cell or said first data cell group;

receiving a go-back command from the user; and responsive to said go-back command, retrieving the initial value corresponding to said subsequently selected data cell, resetting the value of said subsequently selected data cell to said initial value, and transferring said initial value to the web server, without requiring a page refresh of the browser, for storage in association with said subsequently selected data cell.

8. The method of claim 5, each data cell in said first data cell group comprising an initial value prior to said receiving editing commands, further comprising:

maintaining the initial value of each data cell in said first data cell group in a memory of said user computer associated with said browser;

subsequent to said first terminating input, receiving a plurality of user inputs in said browser unrelated to said first data cell or said first data cell group;

receiving a subsequent user selection of any of said first data cell or said first data cell group;

receiving a go-back command from the user; and if said plurality of unrelated user inputs resulted in a page refresh prior to said go-back command, keeping said subsequently selected data cell at said first value;

if said plurality of unrelated user inputs did not result in a page refresh prior to said go-back command, retrieving the initial value corresponding to said subsequently selected data cell, resetting the value of said subsequently selected data cell to said initial value, and transferring said initial value to the web server, without requiring a page refresh of the browser, for storage in association with said subsequently selected data cell.

* * * * *